(12) United States Patent
Oga et al.

(10) Patent No.: US 12,464,481 B2
(45) Date of Patent: Nov. 4, 2025

(54) INTERFACE CONVERSION APPARATUS FOR A MOBILE COMMUNICATION SYSTEM

(71) Applicant: Mitsubishi Electric Corporation, Tokyo (JP)

(72) Inventors: Masao Oga, Tokyo (JP); Yuji Miyake, Tokyo (JP); Ryo Matsunaga, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 322 days.

(21) Appl. No.: 18/189,015

(22) Filed: Mar. 23, 2023

(65) Prior Publication Data

US 2023/0232353 A1 Jul. 20, 2023

Related U.S. Application Data

(63) Continuation of application No. PCT/JP2020/045074, filed on Dec. 3, 2020.

(51) Int. Cl.
*H04W 56/00* (2009.01)
*H04L 43/087* (2022.01)
*H04L 67/12* (2022.01)

(52) U.S. Cl.
CPC ......... *H04W 56/003* (2013.01); *H04L 43/087* (2013.01); *H04L 67/12* (2013.01); *H04W 56/004* (2013.01)

(58) Field of Classification Search
CPC ........... H04W 28/0236; H04W 56/003; H04W 56/004; H04W 56/005; H04L 43/0852; H04L 43/087; H04L 67/12
See application file for complete search history.

(56) References Cited

U.S. PATENT DOCUMENTS 11,677,689 B2 * 6/2023 Xu .......................... H04L 47/30
370/235
2007/0201498 A1 * 8/2007 Tanaka .................. H04L 47/283
370/252

(Continued)

FOREIGN PATENT DOCUMENTS

WO WO 2020/122782 A1 6/2020

OTHER PUBLICATIONS

"3rd Generation Partnership Project; Technical Specification Group Radio Access Network; NG-RAN; PDU Session User Plane Protocol (Release 16)", 3GPP TS 38.415 V16.1.0, Technical Specification, Jul. 2020, pp. 1-15.

(Continued)

*Primary Examiner* — Jeong S Park
(74) *Attorney, Agent, or Firm* — Birch, Stewart, Kolasch & Birch, LLP

(57) ABSTRACT

An interface conversion apparatus includes processing circuitry. The processing circuitry measures communication quality inside the mobile communication system. The processing circuitry refers to evaluation index information specifying, for each communication group, an allowable range of variation in the measurement result of the communication quality and a fluctuation adjustment time, and determines the communication group in which a variation in the measurement result of the communication quality obtained from history information including a measurement result falls within the allowable range for each piece of identification information included in the packet. The processing circuitry selects the communication group of the packet received from the identification information of the packet received, based on a correspondence relationship between the communication group determined and the identification information of the packet. The processing circuitry controls the packet received for each communication group, (Continued)

using the fluctuation adjustment time in the evaluation index information corresponding to the communication group determined.

15 Claims, 22 Drawing Sheets

(56) References Cited

U.S. PATENT DOCUMENTS

| | | | | |
|---|---|---|---|---|
| 2007/0223467 | A1* | 9/2007 | Makiuchi | G10L 19/00 370/363 |
| 2014/0307728 | A1* | 10/2014 | Nakajima | H04W 56/003 370/350 |
| 2015/0092585 | A1* | 4/2015 | Shao | H04L 47/283 370/252 |
| 2019/0215254 | A1* | 7/2019 | Yoshida | G05B 11/36 |
| 2019/0280983 | A1* | 9/2019 | Thubert | H04L 47/283 |

OTHER PUBLICATIONS

"3rd Generation Partnership Project; Technical Specification Group Services and System Aspects; Study on enhancement of 5G System (5GS) for vertical and Local Area Network (LAN) services (Release 16)", 3GPP TR 23.734 V16.2.0, Technical Report, Jun. 2019, pp. 1-117.

"3rd Generation Partnership Project; Technical Specification Group Services and System Aspects; System architecture for the 5G System (5GS); Stage 2 (Release 16)", 3GPP TS 23.501 V16.6.0, Technical Specification, Sep. 2020, pp. 1-447.

Extended European Search Report for European Application No. 20964287.5, dated Nov. 7, 2023.

Huawei et al., "KI#3A: Evaluation and Conclusion for KI#3A," 3GPP TSG-WG SA2 Meeting #141E e-meeting, Elbonia, S2-2007004, Oct. 12-23, 2020.

Nokia et al., "KI#3A, Sol #5: Update to Solution #5 to Resolve Editor's Notes," SA WG2 Meeting #140E, S2-2005738, Online, Aug. 19-Sep. 2, 2020.

* cited by examiner

FIG.8

| Traffic Class | SET VALUE | PRIORITY |
|---|---|---|
| TC#7 | 111 | HIGH |
| TC#6 | 110 | |
| TC#5 | 101 | |
| TC#4 | 100 | |
| TC#3 | 011 | |
| TC#2 | 010 | |
| TC#1 | 001 | |
| TC#0 | 000 | LOW |

FIG.9

| TIME | SEND GATE | | | | | | | |
|---|---|---|---|---|---|---|---|---|
| | #7 | #6 | #5 | #4 | #3 | #2 | #1 | #0 |
| T00 | Open | Closed | Open | Open | Closed | Open | Open | Open |
| T01 | Closed | Open | Closed | Open | Open | Closed | Closed | Open |
| T02 | Open | Closed | Open | Open | Closed | Open | Open | Open |
| T03 | Open | Open | Closed | Open | Open | Closed | Closed | Open |
| ⋮ | | | | | | | | |
| T78 | Open | Closed | Open | Open | Closed | Open | Open | Open |
| T79 | Closed | Open | Closed | Open | Open | Closed | Closed | Closed |

220

221    222

| COMMUNICA-TION GROUP | PERMITTED PRIORITY | FLUCTUATION AMOUNT ALLOWABLE VALUE [μs] | TIME ADJUSTMENT AMOUNT [μs] |
|---|---|---|---|
| 1 | HIGH PRIORITY | 500 | 2000 |
| 2 | HIGH/MEDIUM PRIORITY | 2500 | 100000 |
| 3 | MEDIUM/LOW PRIORITY | 200000 | 300000 |
| 4 | LOW PRIORITY | - | 1000000 |
| ⋮ | | | |

INTERFACE CONVERSION APPARATUS FOR A MOBILE COMMUNICATION SYSTEM

CROSS-REFERENCE TO RELATED APPLICATION

This application is a continuation application of International Application PCT/JP2020/045074, filed on Dec. 3, 2020, and designating the U.S., the entire contents of which are incorporated herein by reference.

BACKGROUND OF THE INVENTION

1. Field of the Invention

The present disclosure relates to an interface conversion apparatus, a control circuit, a storage medium, and a network configuration method for a mobile wireless communication network.

2. Description of the Related Art

5th generation mobile communication (hereinafter referred to as 5G) systems being standardized by the 3rd Generation Partnership Project (3GPP) have been developed to be available for industrial applications utilizing high reliability and low latency, and expected to conform to Time-Sensitive Communication (TSC) that provides communication with accurate time synchronization for industrial Ethernet (registered trademark) or the like. In order to support Time-Sensitive Networking (TSN) protocols standardized by the Institute of Electrical and Electronics Engineers (IEEE), such as IEEE 802.1AS and IEEE 802.1Qbv, without affecting industrial equipment that has until recently been based on a communication environment with wired connection such as a local area network (LAN) in a factory, it is necessary to reduce transmission delays, fluctuations, and the like in Ethernet packets that transmit data according to an industrial protocol such as Control & Communication (CC)-Link Industrial Ethernet (IE, registered trademark) TSN in a mobile communication network that changes due to the radio wave environment, movement, and the like, and further to reliably transmit control information in communication with industrial equipment. Therefore, technology for achieving high reliability and low latency in 5G systems for application to industrial networks is being standardized. Meanwhile, there is a problem in the wireless implementation of industrial networks: because time-synchronized devices operate in cooperation in a network, it is necessary to configure the network taking in considering the characteristics of communication lines that are significantly affected by the radio wave environment.

As a method for solving this problem, Patent Literature 1 discloses a technique for the wireless implementation of industrial networks, in which in order to make a 5G system into a logical TSN bridge on an industrial network, fluctuations in data arrival time in all wireless sections are absorbed, and thereafter packets are sent at a predetermined time to another TSN bridge and an endstation that perform communication. This allows the 5G system to be regarded as being in a logical TSN bridge having a fixed intra-apparatus communication delay, making it possible to ensure the required quality of the industrial protocol that uses TSN while treating the 5G system as an apparatus in the TSN network.

CITATION LIST

Patent Literature

Patent Literature 1: PCT Patent Application Laid-open No. 2020/122782

However, according to the above-described conventional technique, upon a change in the radio wave environment due to movement, shielding, relay, or the like, data having the same priority require to be set with a fluctuation adjustment time for absorbing fluctuations in data arrival time based on communication lines that are significantly affected by the radio wave environment. As a result, the fluctuation adjustment time for the data having the same priority does not contribute to the performance of communication lines that are not significantly affected by the radio wave environment and have good communication quality, which is problematic.

The present disclosure has been made in view of the above, and an object thereof is to obtain an interface conversion apparatus capable of reducing the influence of fluctuation adjustment time on data transmission caused by different radio wave environments in a mobile wireless communication network that transmits data according to an industrial protocol.

SUMMARY OF THE INVENTION

In order to solve the above-described problems and achieve the object, the present disclosure is an interface conversion apparatus to be provided in a mobile communication system that transmits data according to an industrial protocol, and including processing circuitry. The processing circuitry measures communication quality inside the mobile communication system. The processing circuitry stores history information including a measurement result of the communication quality measured. The processing circuitry refers to evaluation index information specifying, for each communication group, an allowable range of variation in the measurement result of the communication quality allowed and a fluctuation adjustment time for absorbing a fluctuation in an arrival time of a packet received, and determines the communication group in which a variation in the measurement result of the communication quality obtained from the history information falls within the allowable range for each piece of identification information including a communication protocol type included in the packet. The processing circuitry selects the communication group of the packet received from the identification information of the packet received, based on a correspondence relationship between the communication group determined and the identification information of the packet. The processing circuitry controls the packet received for each communication group, using the fluctuation adjustment time in the evaluation index information corresponding to the communication group that is determined.

BRIEF DESCRIPTION OF THE DRAWINGS

FIG. 8 is a diagram illustrating an example of traffic classes of send queues provided in the time-division scheduling unit of the network-side interface conversion apparatus according to the first embodiment.

FIG. 9 is a diagram illustrating an exemplary configuration of a gate control list provided in the time-division scheduling unit of the network-side interface conversion apparatus according to the first embodiment.

DETAILED DESCRIPTION OF THE PREFERRED EMBODIMENTS

Hereinafter, an interface conversion apparatus, a control circuit, a storage medium, and a network configuration method according to embodiments of the present disclosure will be described in detail with reference to the drawings. The following description is based on the premise that the mobile wireless communication network is a 5G system, but the mobile wireless communication network is not limited thereto.

First Embodiment

Figure 1:
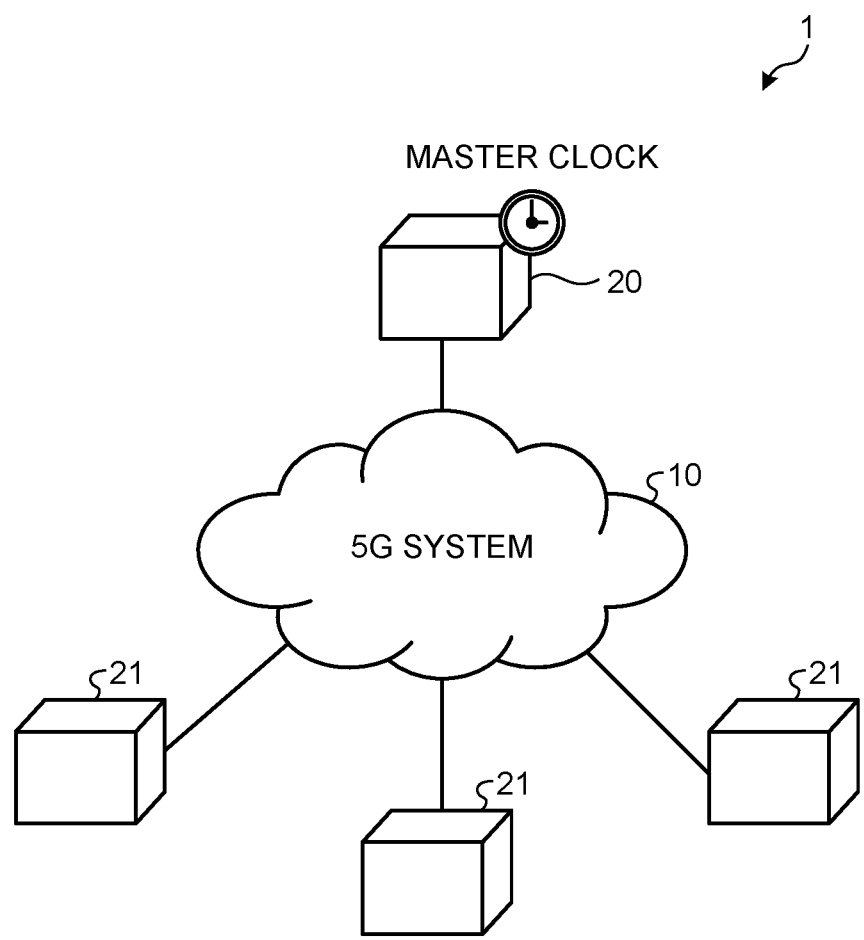
FIG. 1 is a diagram illustrating an exemplary configuration of a mobile wireless communication network according to a first embodiment.

FIG. 1 is a diagram illustrating an exemplary configuration of a mobile wireless communication network according to the first embodiment. The mobile wireless communication network 1 is a network that supports TSC. The mobile wireless communication network 1 includes a 5G system 10, a TSN bridge 20, and TSN devices 21. The 5G system 10 is a mobile communication system that transmits data according to an industrial protocol. The 5G system 10 includes communication devices conforming to 5G wireless standards, and provides service on the mobile wireless communication network 1. The TSN devices 21 are communication devices such as TSN bridges and endstations. The TSN bridge 20 is synchronized with the master clock of the TSN, performs time synchronization with the TSN devices 21 via the 5G system 10, and performs communication for industrial protocol or the like.

Figure 2:
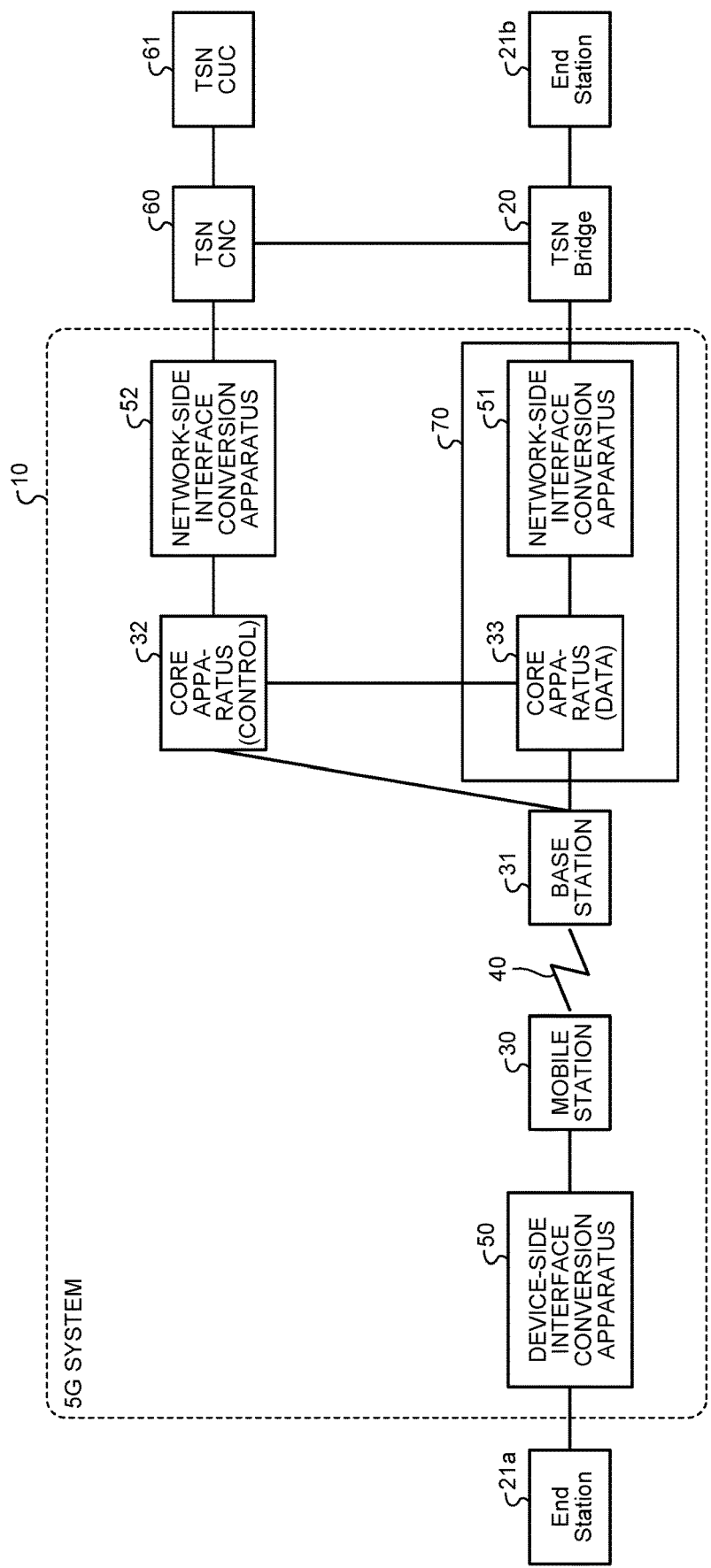
FIG. 2 is a block diagram illustrating an exemplary configuration of a logical TSN bridge in the 5G system according to the first embodiment.

FIG. 2 is a block diagram illustrating an exemplary configuration of a logical TSN bridge in the 5G system according to the first embodiment. In the 3GPP standards, the 5G system 10 can be regarded as constituting one logical TSN bridge as viewed from the TSN bridge 20, the TSN devices 21, and the like connected to the 5G system 10. In FIG. 2, a configuration of the logical TSN bridge is illustrated. FIG. 2 illustrates an example in which among the TSN devices 21 illustrated in FIG. 1, the TSN device 21 located on the device side is treated as an endstation 21a, and the TSN device 21 located on the network side is treated as an endstation 21b.

The 5G system 10 includes a mobile station 30, a base station 31, core apparatuses 32 and 33, a device-side interface conversion apparatus 50, and network-side interface conversion apparatuses 51 and 52. In the 5G system 10, a service area is configured by wireless signals 40 sent from the base station 31, and the mobile station 30 in the service area is connected to the base station 31 by the wireless signals 40.

The core apparatus 32 is an apparatus that performs call control, authentication processing, and location management of the mobile station 30. The core apparatus 32 controls the base station 31.

The core apparatus 33 is a gateway apparatus that transfers data when the mobile station 30 performs communication via the base station 31. The core apparatus 33 performs transfer processing of data according to industrial protocol in the communication performed between the endstation 21a, the TSN bridge 20, and the endstation 21b.

The device-side interface conversion apparatus 50 is an interface conversion apparatus that is provided between the endstation 21a and the mobile station 30, performs conversion processing of TSN protocol, and relays an Ethernet packet that transmits data according to an industrial protocol.

The network-side interface conversion apparatus 51 is an interface conversion apparatus that is provided between the TSN bridge 20 and the core apparatus 33, performs conversion processing of TSN protocol, and relays an Ethernet packet that transmits data according to an industrial protocol. Where the functionality described in the first embodiment can be provided in both the core apparatus 33 and the network-side interface conversion apparatus 51, the combination of these apparatuses is referred to as a network-side interface conversion apparatus 70.

The network-side interface conversion apparatus 52 is an interface conversion apparatus that performs protocol conversion for converting a Quality of Service (QoS) setting from a Time-Sensitive Networking Centralized Network Configuration (TSNCNC) 60 and a Time-Sensitive Networking Centralized User Configuration (TSNCUC) 61, Ethernet packet scheduling information that is based on clock information, or the like into a QoS setting for the 5G system 10. The TSNCNC 60 and the TSNCUC 61 are TSN control apparatuses responsible for user settings, network settings, and the like. The network-side interface conversion apparatus 52 also transmits port setting information and the like of the device-side interface conversion apparatus 50 via a wireless protocol.

Note that the 5G system 10 is configured such that a plurality of mobile stations 30 can be connected in subordination to the base station 31, and such that a plurality of base stations 31 can be connected in subordination to the core apparatuses 32 and 33. The device-side interface conversion apparatus 50 and the network-side interface conversion apparatus 51 are connected to only one TSN device 21 in the example of FIG. 2, but can be connected to a plurality of TSN devices 21 by LAN connection.

A configuration for connection of the base station 31 provided in the 5G system 10 will be described. In the 3GPP standards, a technology called Integrated Access and Backhaul (IAB) can be introduced to provide wireless backhaul lines for the base station 31, and a flexible network can be configured by connecting with wireless signals not only between the mobile station 30 and the base station 31 but also between different base stations 31.

Figure 3:
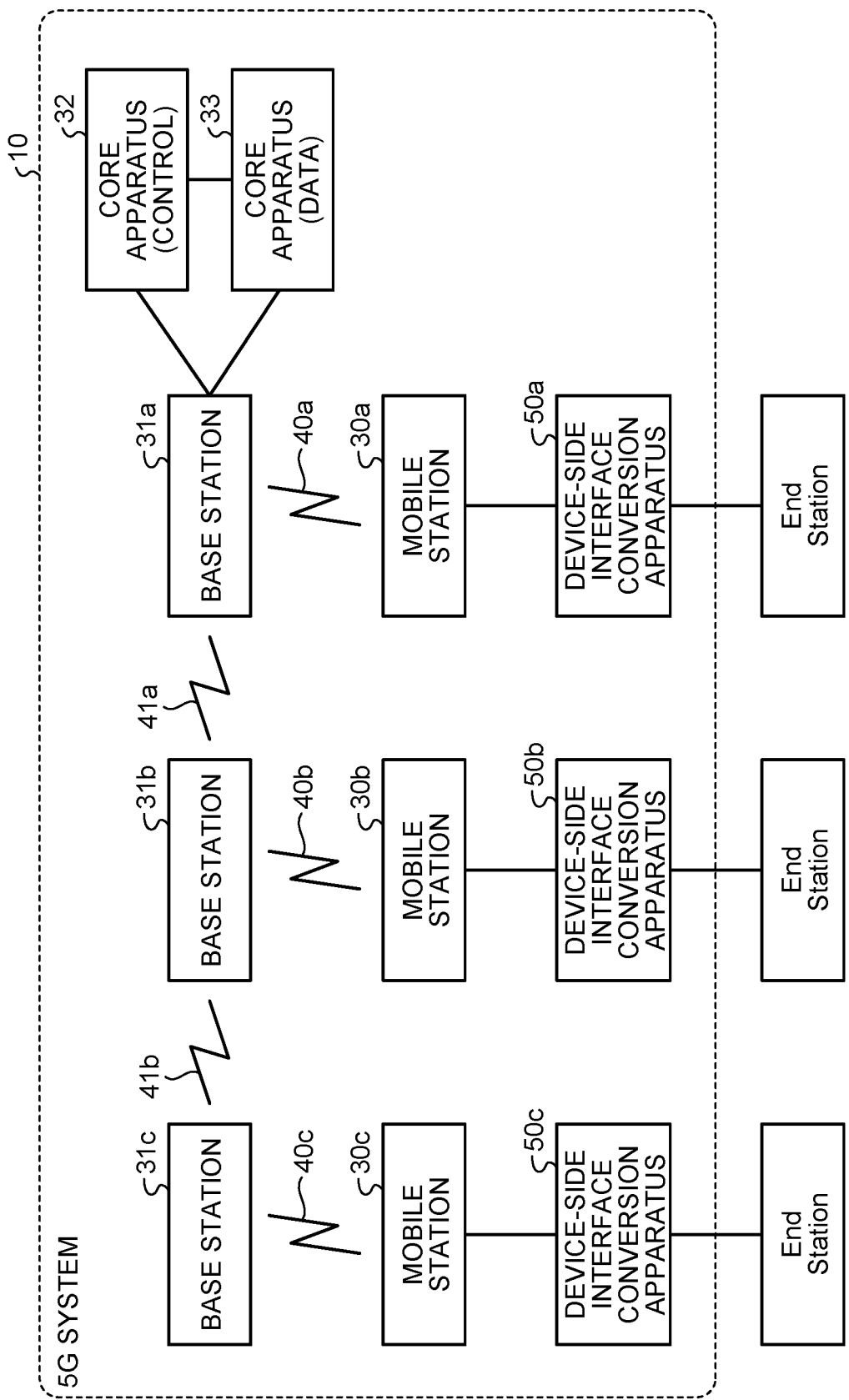
FIG. 3 is a diagram illustrating an exemplary configuration for connection of base stations in the 5G system according to the first embodiment.

FIG. 3 is a diagram illustrating an exemplary configuration for connection of base stations in the 5G system according to the first embodiment. In FIG. 3, a base station 31a connected to the core apparatuses 32 and 33 is a base station serving as an anchor for switching from the wired network to the wireless network. The base station 31a is connected by a wireless signal 40a to a mobile station 30a connected to a device-side interface conversion apparatus 50a. Further, the base station 31a is connected to a base station 31b via a wireless signal 41a. Here, the wireless signal 40a and the wireless signal 41a may be the same wireless signal, or may be configured by wireless signals having different frequency bands, for example.

The base station 31b is connected by a wireless signal 40b to a mobile station 30b connected to a device-side interface conversion apparatus 50b. The illustrated example is based on the assumption that the mobile station 30b is located where the wireless signal 40a sent from the base station 31a cannot be observed. However, the mobile station 30b may observe the wireless signal 40a, in which case the mobile station 30b can be connected to the base station 31a or 31b having a better radio wave environment. In addition, the base station 31b is connected to a base station 31c via a wireless signal 41b. The base station 31c is connected by a wireless signal 40c to a mobile station 30c connected to a device-side interface conversion apparatus 50c.

This connection mode is based on the premise that the wireless connection of the mobile stations 30a, 30b, and 30c is controlled by the base station 31a serving as the anchor, and the base stations 31b and 31c perform wireless communication with the mobile stations 30b and 30c based on the control from the base station 31a. However, each base station may control the wireless connection of the station(s) connected thereto: the base stations 31a, 31b, and 31c may respectively control the wireless connection of the mobile stations 30a, 30b, and 30c and the base stations 31b and 31c, on which no limitation is imposed in the present disclosure.

Figure 4:
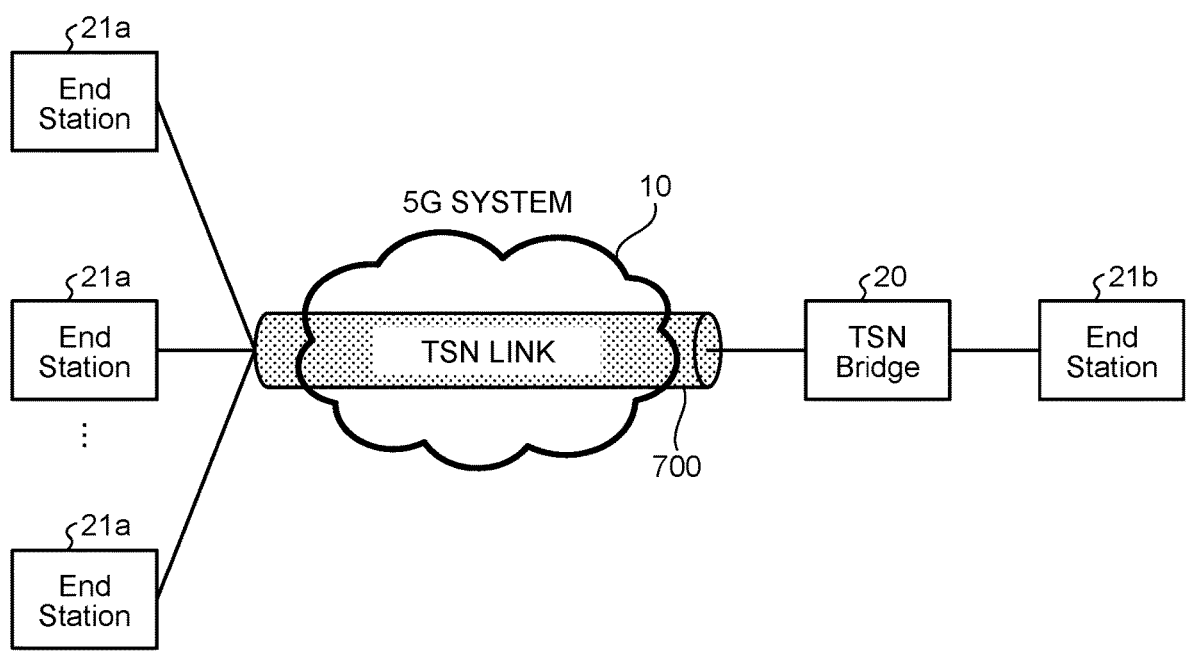
FIG. 4 is a diagram illustrating an example of a TSN link established by the configuration of the logical TSN bridge in the 5G system according to the first embodiment.

FIG. 4 is a diagram illustrating an example of a TSN link established by the configuration of the logical TSN bridge in the 5G system according to the first embodiment. The network between the network-side interface conversion apparatus 70 and the device-side interface conversion apparatus 50 in the 5G system 10 is regarded as one TSN link 700 having one fixed delay time in the logical TSN bridge of the 5G system 10 from the viewpoint of the time-constrained applications of the TSN bridge 20 and the endstations 21a.

Figure 5:
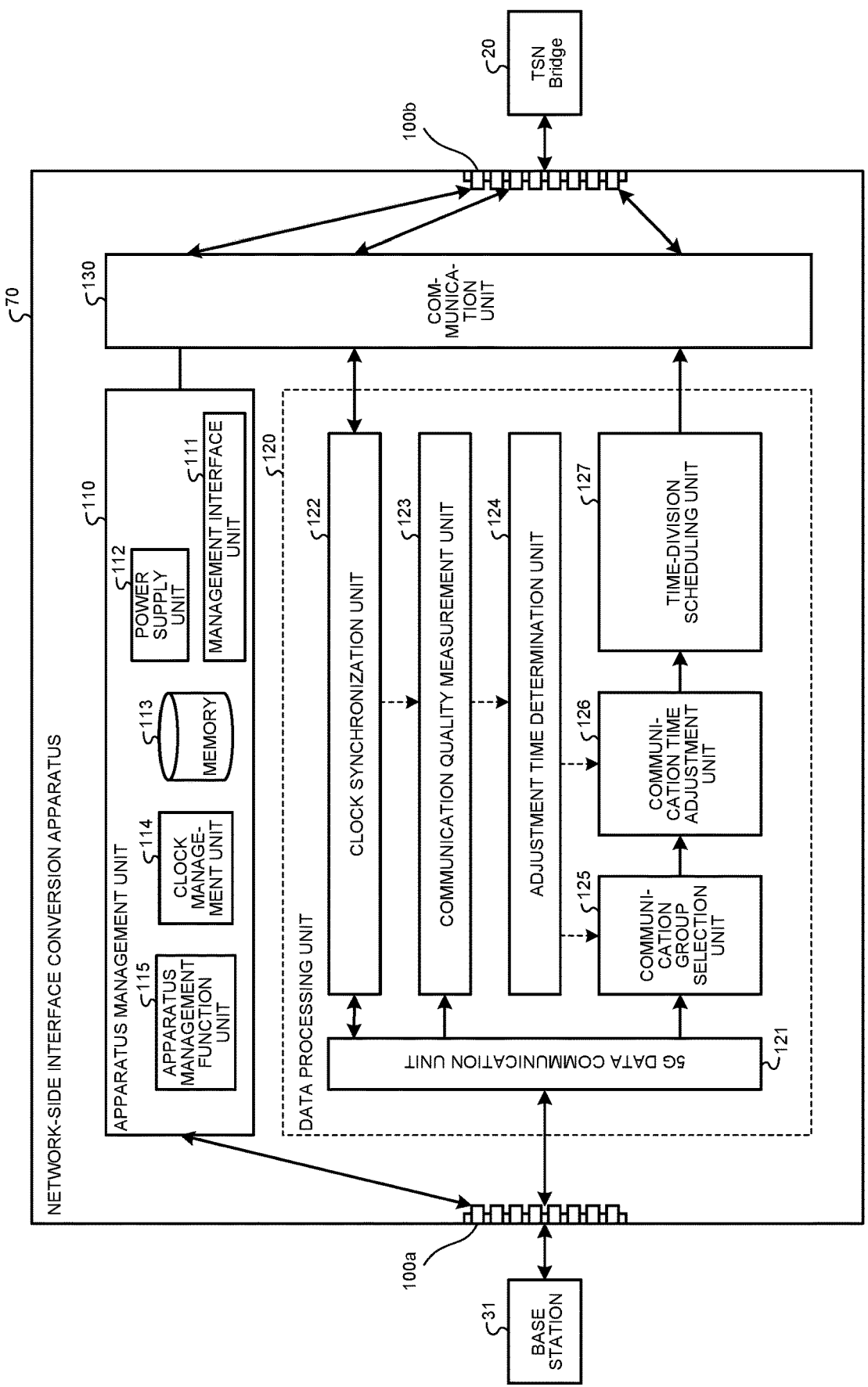
FIG. 5 is a block diagram illustrating an exemplary configuration of a network-side interface conversion apparatus according to the first embodiment.

A configuration of the network-side interface conversion apparatus 70 provided in the 5G system 10 will be described. FIG. 5 is a block diagram illustrating an exemplary configuration of the network-side interface conversion apparatus according to the first embodiment. The network-side interface conversion apparatus 70 includes external interfaces 100a and 100b, an apparatus management unit 110, a data processing unit 120, and a communication unit 130.

The external interface 100a is a physical interface connectable to an optical line of Registered Jack (RJ) 45 or the like connected to the base station 31.

The external interface 100b is a physical interface connectable to an Ethernet line of RJ45 or the like connected to the TSN bridge 20.

The apparatus management unit 110 configures settings and management of the network-side interface conversion apparatus 70. The apparatus management unit 110 includes a management interface unit 111, a power supply unit 112, a memory 113, a clock management unit 114, and an apparatus management function unit 115.

The management interface unit 111 communicates with the network-side interface conversion apparatus 52 and control apparatuses such as the TSNCNC 60 and the TSN- CUC 61, and acquires setting information and the like of the network-side interface conversion apparatus 70. The power supply unit 112 supplies power to each component of the network-side interface conversion apparatus 70. The memory 113 is a storage unit that stores setting information such as apparatus parameters and TSN protocol-related parameters for operating the network-side interface conversion apparatus 70. In one example, the memory 113 also stores history information including a measurement result of communication quality measured by a communication quality measurement unit 123 of the data processing unit 120 described later. The clock management unit 114 manages clock information acquired from a clock synchronization unit 122 (to be described later) of the data processing unit 120. The apparatus management function unit 115 manages apparatus states such as the operating state of the network-side interface conversion apparatus 70.

When the network-side interface conversion apparatus 70 is configured as separate apparatuses, namely the core apparatus 33 and the network-side interface conversion apparatus 51, the apparatus management unit 110 provided in the individual apparatuses may be equipped with a processing unit that implements the function required of each apparatus.

The data processing unit 120 performs data transmission processing in the 5G system 10 and TSN protocol conversion processing for connection with the external TSN bridge 20. The data processing unit 120 includes a 5G data communication unit 121, the clock synchronization unit 122, the communication quality measurement unit 123, an adjustment time determination unit 124, a communication group selection unit 125, a communication time adjustment unit 126, and a time-division scheduling unit 127.

The 5G data communication unit 121 is a functional unit that implements the function of the core apparatus 33, and communicates in time synchronization with the base station 31. Further, the 5G data communication unit 121 performs QoS control in the 5G system 10 based on the QoS setting obtained through conversion in the network-side interface conversion apparatus 52. The clock synchronization unit 122 performs time synchronization processing based on IEEE 802.1AS.

The communication quality measurement unit 123 measures communication quality inside the mobile communication system. The communication quality is exemplified by a communication delay amount which is a delay amount and a fluctuation amount which is a variation in communication delay amount. In one example, the communication quality measurement unit 123 measures, for an Ethernet packet sent from the endstation 21a, a communication delay amount and a fluctuation amount per packet or per application in the 5G system 10 from the device-side interface conversion apparatus 50 to the network-side interface conversion apparatus 70, and stores the communication delay amount and the fluctuation amount in the memory 113. Specifically, the communication quality measurement unit 123 measures a communication delay amount inside the mobile communication system based on the difference between the time of output from the network-side interface conversion apparatus 70 serving as a sending terminal in the mobile communication system, and the time of input from the device-side interface conversion apparatus 50 serving as a receiving terminal. The communication quality measurement unit 123 calculates a packet fluctuation amount from the measured communication delay amount, and stores the communication delay amount and the fluctuation amount as history information in the storage unit, namely the memory 113.

Based on evaluation index information specifying, for each communication group, the allowable range of variation in the measurement result of communication quality allowed and a fluctuation adjustment time for absorbing a fluctuation in the arrival time of the received packet, the adjustment time determination unit 124 determines the communication group, in which the variation in the measurement result of communication quality obtained from the history information is within the allowable range, for each piece of identification information including a communication protocol type included in the packet. Specifically, the adjustment time determination unit 124 acquires the communication delay amount and the fluctuation amount stored in the memory 113, evaluates a fluctuation absorption time for each piece of TSN-communication-group-information set from the network-side interface conversion apparatus 52, and determines each buffer length. Here, the TSN-communication-group-information is available as information set from the network-side interface conversion apparatus 52 and stored in the memory 113, but may be saved in the network-side interface conversion apparatus 70 in advance or may be set from a maintenance tool or the like different from the network-side interface conversion apparatus 52.

The communication group selection unit 125 selects the communication group of the received packet from the identification information of the received packet with reference to the correspondence relationship between the communication group determined by the adjustment time determination unit 124 and the identification information of the packet. Specifically, the communication group selection unit 125 identifies the TSN communication group to which the Ethernet packet received from the 5G data communication unit 121 belongs, and transfers the Ethernet packet to the communication time adjustment unit 126.

The communication time adjustment unit 126 controls the received packet for each communication group using the fluctuation adjustment time corresponding to the communication group determined by the adjustment time determination unit 124. Specifically, the communication time adjustment unit 126 performs priority control using queues having different buffer lengths set by the adjustment time determination unit 124 for each TSN communication group. In particular, if received Ethernet packets have the same priority but belong to different TSN communication groups, the buffer lengths differ. The time-division scheduling unit 127 provides a function of controlling the sending time of each traffic class specified in IEEE 802.1Qbv in accurate synchronization with the TSN bridge 20, which is another TSN device.

The time synchronization processing involves performing communication with the TSN bridge 20 via the external interface 100b using the TSN protocol, acquiring clock information, i.e. the input time indicating the time at which the 5G system 10 acquired a SYNC message, from the clock management unit 114 when receiving the SYNC message, adding the input time to the SYNC message, and updating the SYNC message. Then, the updated SYNC message is sent to the base station 31 and the mobile station 30 via the 5G data communication unit 121 and the external interface 100a. Upon receiving the updated SYNC message, the device-side interface conversion apparatus 50 adds the delay amount of the 5G system 10 to the correctionField of the message used in the TSN protocol, and transfers the message to the TSN bridge 20 to perform time synchronization with the TSN device. This description is based on the premise that the message used in the TSN protocol is a SYNC message.

The communication unit 130 provides a function of enabling the apparatus management unit 110 and the data processing unit 120 to communicate with the TSN bridge 20 via the external interface 100b.

Figure 6:
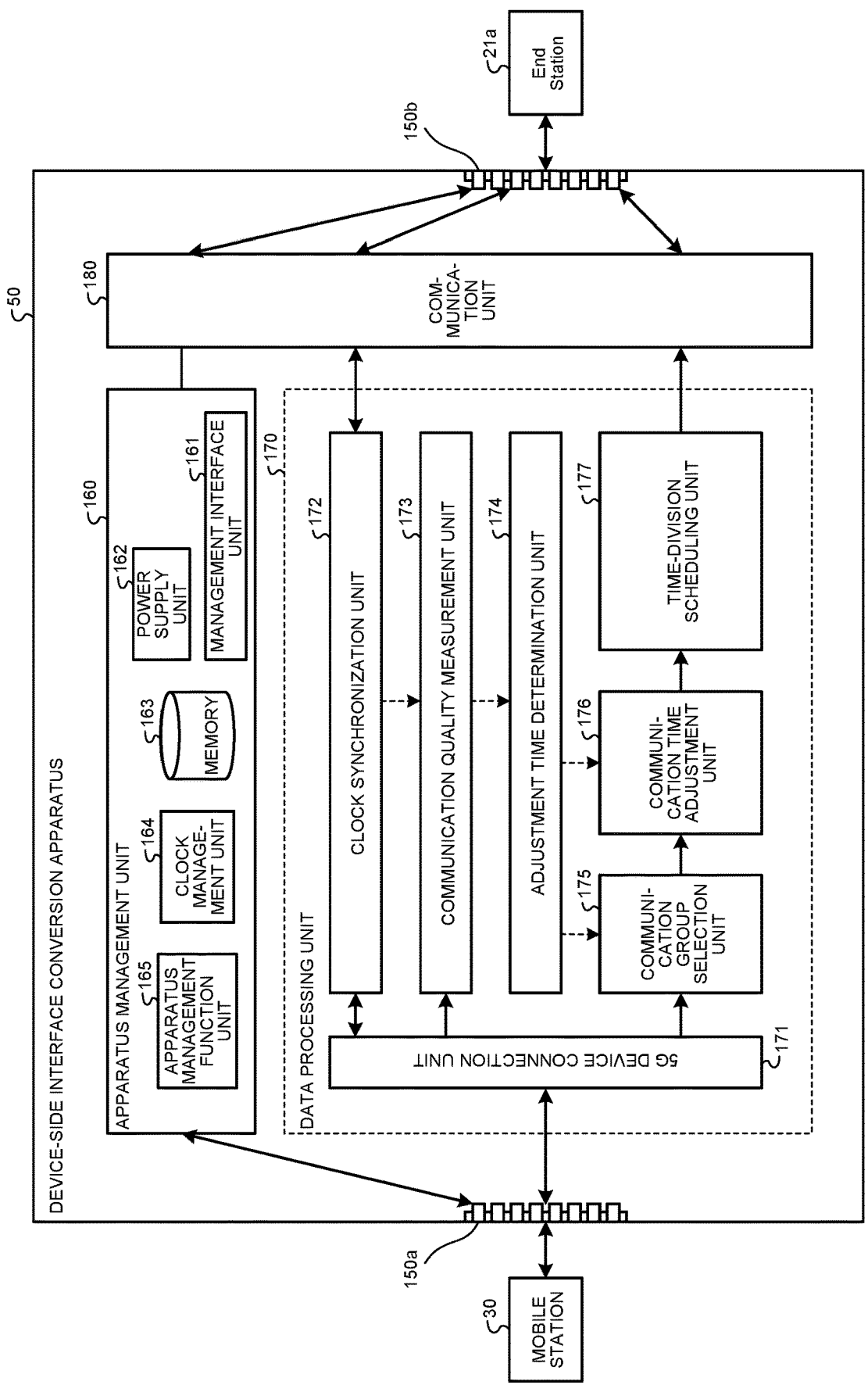
FIG. 6 is a block diagram illustrating an exemplary configuration of a device-side interface conversion apparatus according to the first embodiment.

Next, a configuration of the device-side interface conversion apparatus 50 provided in the 5G system 10 will be described. FIG. 6 is a block diagram illustrating an exemplary configuration of the device-side interface conversion apparatus according to the first embodiment. The basic configuration is similar to that of the network-side interface conversion apparatus 70. The device-side interface conversion apparatus 50 includes external interfaces 150a and 150b, an apparatus management unit 160, a data processing unit 170, and a communication unit 180.

The external interface 150a is a physical interface configured by Universal Serial Bus (USB), RJ45, or the like and connected to the mobile station 30.

The external interface 150b is a physical interface connectable to an Ethernet line of RJ45 or the like connected to the endstation 21a.

The apparatus management unit 160 configures settings for and performs management of the device-side interface conversion apparatus 50. The apparatus management unit 160 includes a management interface unit 161, a power supply unit 162, a memory 163, a clock management unit 164, and an apparatus management function unit 165.

The management interface unit 161 communicates with the device-side interface conversion apparatus 50, the network-side interface conversion apparatus 52, and control apparatuses such as the TSNCNC 60 and the TSNCUC 61, and acquires setting information and the like of the device-side interface conversion apparatus 50. The power supply unit 162 supplies power to each component of the device-side interface conversion apparatus 50. The memory 163 is a storage unit that stores setting information such as apparatus parameters and TSN protocol-related parameters for operating the device-side interface conversion apparatus 50. In one example, the memory 163 also stores history information including a measurement result of communication quality measured by a communication quality measurement unit 173 of the data processing unit 170 described later. The clock management unit 164 manages clock information acquired from a clock synchronization unit 172 (to be described later) of the data processing unit 170. The apparatus management function unit 165 manages apparatus states such as the operating state of the device-side interface conversion apparatus 50.

The data processing unit 170 performs data transmission processing in the 5G system 10 and TSN protocol conversion processing for connection with the endstation 21a, which is an external TSN device. The data processing unit 170 includes a 5G device connection unit 171, the clock synchronization unit 172, the communication quality measurement unit 173, an adjustment time determination unit 174, a communication group selection unit 175, a communication time adjustment unit 176, and a time-division scheduling unit 177.

The 5G device connection unit 171 is a functional unit that communicates with the mobile station 30. The clock synchronization unit 172 performs time synchronization processing based on IEEE 802.1AS.

The communication quality measurement unit 173 measures communication quality inside the mobile communication system. The communication quality is exemplified by a communication delay amount which is a delay amount and a fluctuation amount which is a variation in communication delay amount. In one example, as history information, the communication quality measurement unit 173 measures a communication delay amount and a fluctuation amount per packet or per application in the 5G system 10, from the network-side interface conversion apparatus 70 to the present device-side interface conversion apparatus 50 for an Ethernet packet sent from the endstation 21b or the TSN bridge 20, or from the device-side interface conversion apparatus 50 to the present device-side interface conversion apparatus 50 for an Ethernet packet sent from the endstation 21a connected to the device-side interface conversion apparatus 50 subordinate to another mobile station 30, and stores the history information in the storage unit, namely the memory 163.

The adjustment time determination unit 174 refers to evaluation index information specifying, for each communication group, the allowable range of variation in the measurement result of communication quality allowed and a fluctuation adjustment time for absorbing a fluctuation in the arrival time of the received packet, and determines the communication group in which the variation in the measurement result of communication quality obtained from the history information falls within the allowable range for each piece of identification information including a communication protocol type included in the packet. Specifically, the adjustment time determination unit 174 acquires the communication delay amount and the fluctuation amount stored in the memory 163, evaluates a fluctuation absorption time for each piece of TSN-communication-group-information set from the network-side interface conversion apparatus 52, and determines each buffer length. Here, the TSN-communication-group-information is available as information set from the network-side interface conversion apparatus 52 and stored in the memory 163, but may be saved in the device-side interface conversion apparatus 50 in advance or may be set from a maintenance tool or the like different from the device-side interface conversion apparatus 50.

The communication group selection unit 175 selects the communication group of the received packet from the identification information of the received packet with reference to the correspondence relationship between the communication group determined by the adjustment time determination unit 174 and the identification information of the packet. Specifically, the communication group selection unit 175 identifies the TSN communication group to which the Ethernet packet received from the 5G device connection unit 171 belongs, and transfers the Ethernet packet to the communication time adjustment unit 176.

The communication time adjustment unit 176 controls the received packet for each communication group using the fluctuation adjustment time corresponding to the communication group determined by the adjustment time determination unit 174. Specifically, the communication time adjustment unit 176 performs priority control using queues having different buffer lengths set from the adjustment time determination unit 174 for each TSN communication group. In particular, if received Ethernet packets have the same priority but belong to different TSN communication groups, the buffer lengths differ. The time-division scheduling unit 177 provides a function of controlling the sending time of each traffic class specified in IEEE 802.1Qbv in accurate synchronization with another TSN device 21.

The communication unit 180 provides a function of enabling the apparatus management unit 160 and the data processing unit 170 to communicate with the endstation 21a via the external interface 150b.

Figure 7:
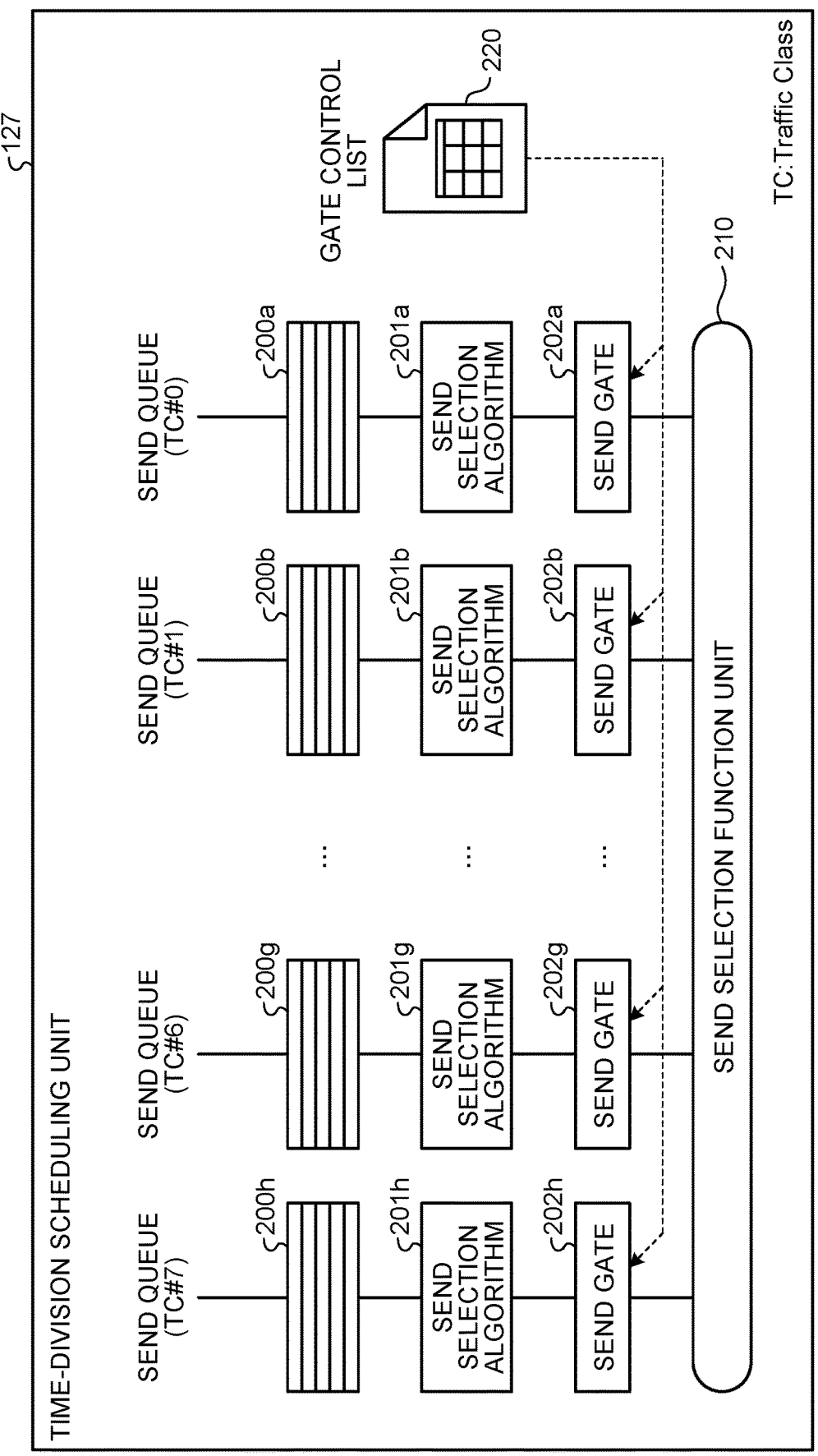
FIG. 7 is a diagram illustrating an exemplary configuration of the time-division scheduling unit provided in the network-side interface conversion apparatus according to the first embodiment.

Next, configurations of the time-division scheduling units 127 and 177 provided respectively in the network-side interface conversion apparatus 70 and the device-side interface conversion apparatus 50 will be described. Both interface conversion apparatuses have the same time-division scheduling function, and thus the configuration of the network-side interface conversion apparatus 70 will be described as an example. FIG. 7 is a diagram illustrating an exemplary configuration of the time-division scheduling unit provided in the network-side interface conversion apparatus according to the first embodiment. The time-division scheduling unit 127 includes send queues 200a to 200h, send selection algorithms 201a to 201h, send gates 202a to 202h, a send selection function unit 210, and a gate control list 220.

The send queues 200a to 200h are send queues corresponding to the traffic classes in FIG. 8 indicating priorities associated with Priority Code Point (PCP) defined in IEEE 802.1p for implementing a function of controlling the sending time of each traffic class in Ethernet packet transmission processing from the 5G system 10 to external TSN devices 21, namely the TSN bridge 20 and the endstation 21b.

FIG. 8 is a diagram illustrating an example of traffic classes of send queues provided in the time-division scheduling unit of the network-side interface conversion apparatus according to the first embodiment. The send queue 200a corresponds to traffic class TC #0, the send queue 200b corresponds to traffic class TC #1, the send queue 200c corresponds to traffic class TC #2, and the send queue 200d corresponds to traffic class TC #3. In addition, the send queue 200e corresponds to traffic class TC #4, the send queue 200f corresponds to traffic class TC #5, the send queue 200g corresponds to traffic class TC #6, and the send queue 200h corresponds to traffic class TC #7. FIGS. 7 and 8 illustrate that the send queue 200a of traffic class TC #0 has the lowest priority, the priority increases as the traffic class number increases, and the send queue 200h of traffic class TC #7 has the highest priority. In FIG. 8, set value is information with which each traffic class is identifiable.

The send selection algorithms 201a to 201h determine whether to send the data stored in the corresponding send queues 200a to 200h.

The send gates 202a to 202h control the Open/Closed state of the gates based on the time specified in the gate control list 220 and the information from the corresponding send selection algorithms 201a to 201h as to whether to send the data in the send queues 200a to 200h.

The send selection function unit 210 sends the data having passed through the send gates 202a to 202h to an external apparatus.

The gate control list 220 specifies Open and Closed for the send gates 202a to 202h. FIG. 9 is a diagram illustrating an exemplary configuration of a gate control list provided in the time-division scheduling unit of the network-side interface conversion apparatus according to the first embodiment. As illustrated in FIG. 9, the gate control list 220 has a send gate state 222, in which Open or Closed is defined for each time 221 for each of the send gates 202a to 202h. "Open" indicates a time slot in which sending is possible and "Closed" indicates a time slot in which sending is not possible.

Figure 10:
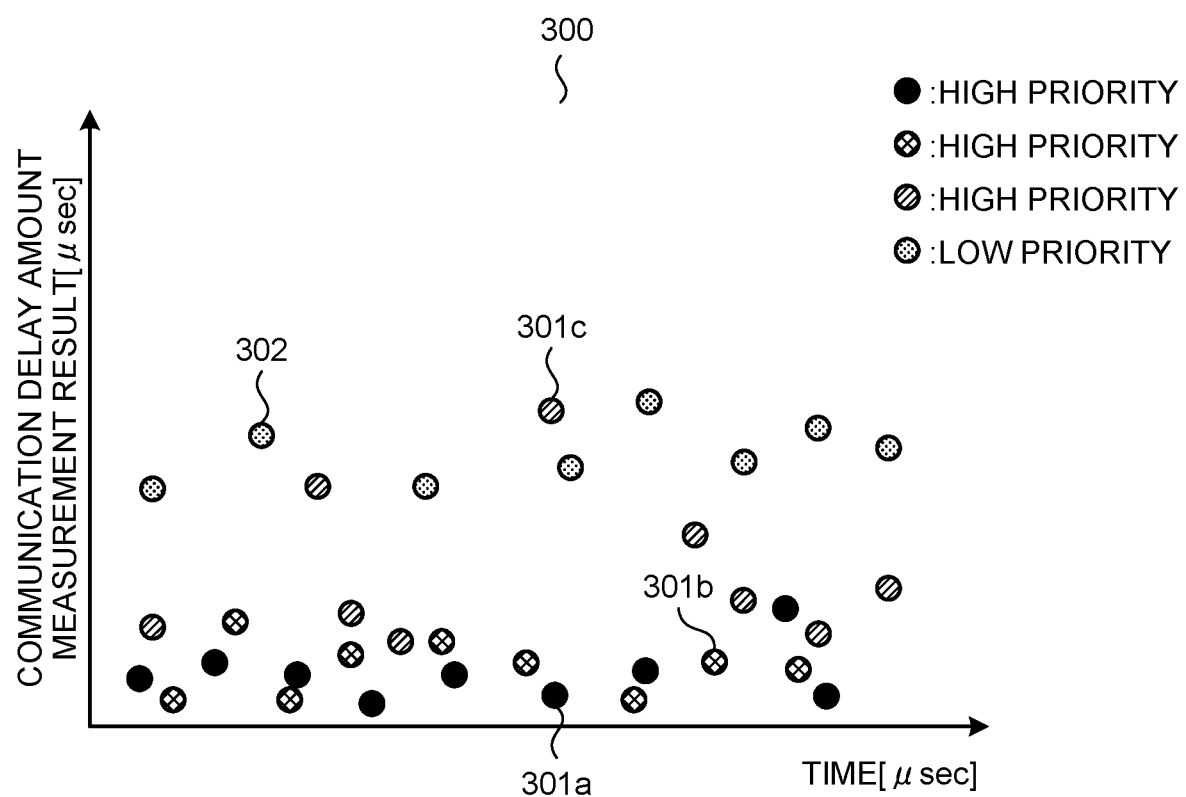
FIG. 10 is a diagram illustrating an exemplary measurement result of communication delay amount in the 5G system according to the first embodiment.

FIG. 10 is a diagram illustrating an exemplary measurement result of communication delay amount in the 5G system according to the first embodiment. In FIG. 10, the horizontal axis represents time, and the vertical axis represents the communication delay amount measurement result. The communication delay amount measurement result 300 has priority information identified with QoS information of the 5G system 10 assigned to each packet transmitted in the 5G system 10. In FIG. 10, measurement results 301a, 301b, and 301c indicate "high priority" packets with high priority, and measurement results 302 indicate "low priority" packets with low priority. The communication delay amount measurement result 300 is generated using the history information stored in the memory 113.

Figure 11:
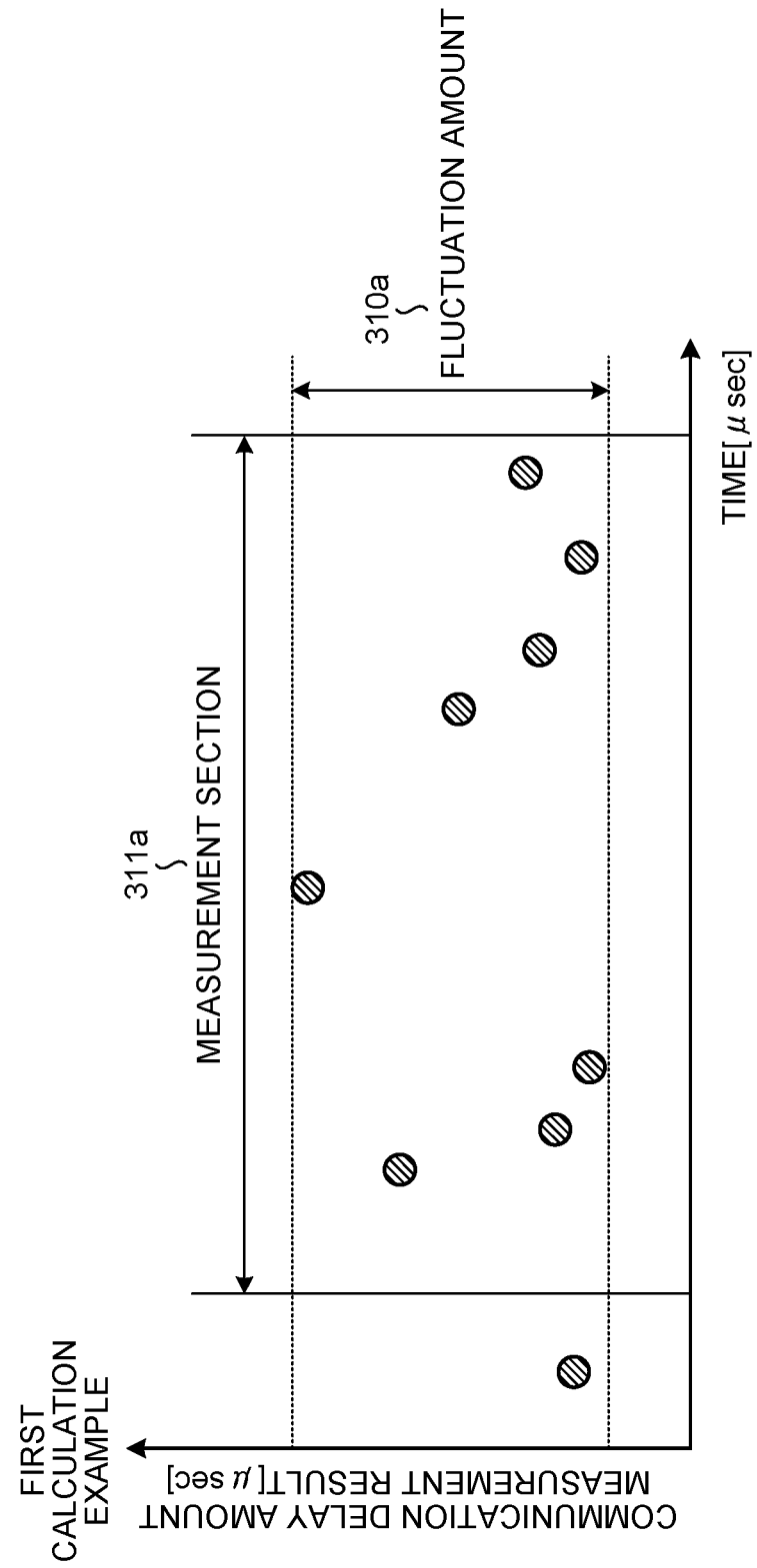
FIG. 11 is a diagram illustrating an exemplary method of calculating a fluctuation amount from the measurement result of communication delay amount in the 5G system according to the first embodiment.
Figure 12:
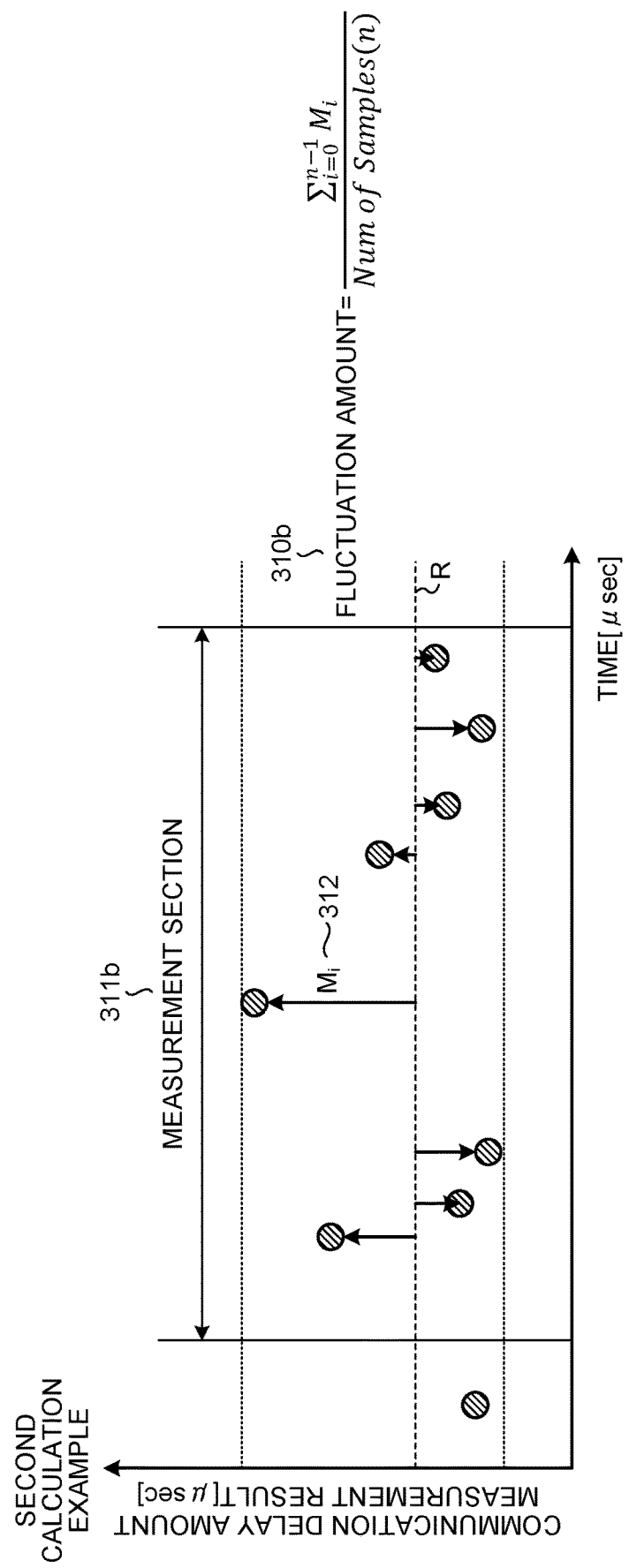
FIG. 12 is a diagram illustrating an exemplary method of calculating a fluctuation amount from the measurement result of communication delay amount in the 5G system according to the first embodiment.

FIGS. 11 and 12 are diagrams illustrating an exemplary method of calculating a fluctuation amount from the measurement result of communication delay amount in the 5G system according to the first embodiment. FIGS. 11 and 12 illustrate the measurement results 301c of packets with high priority that are extracted from FIG. 10. In FIGS. 11 and 12, the horizontal axis represents time, and the vertical axis represents the communication delay amount measurement result. The first calculation example illustrated in FIG. 11 is a method of calculating, as a fluctuation amount 310a, the difference between the maximum value and the minimum value of measurement results of communication delay amount in a measurement section 311a. The second calculation example illustrated in FIG. 12 is a method of calculating, as a fluctuation amount 310b, the average of accumulated time errors 312 from a reference value R, i.e. the average of the measurement results of communication delay amount in a measurement section 311b. Methods other than those illustrated in FIGS. 11 and 12 can also be used for fluctuation amount calculation. In one example, the median of the measurement results of communication delay amount may be used as the reference value R for the calculation of the time error 312 in the second calculation example, or a reception interval or the like may be defined as a fluctuation amount in the case of packets having QoS information of a fixed cycle, on which no limitation is imposed in the present disclosure. Furthermore, instead of "high priority" and "low priority" shown for the sake of simplicity as examples of QoS information indicating priority, a plurality of priorities may be used as in the QoS definition (5QI: 5G QoS Indicator) in the 5G system 10, and the priority to be used is not limited in the present disclosure.

Figure 13:
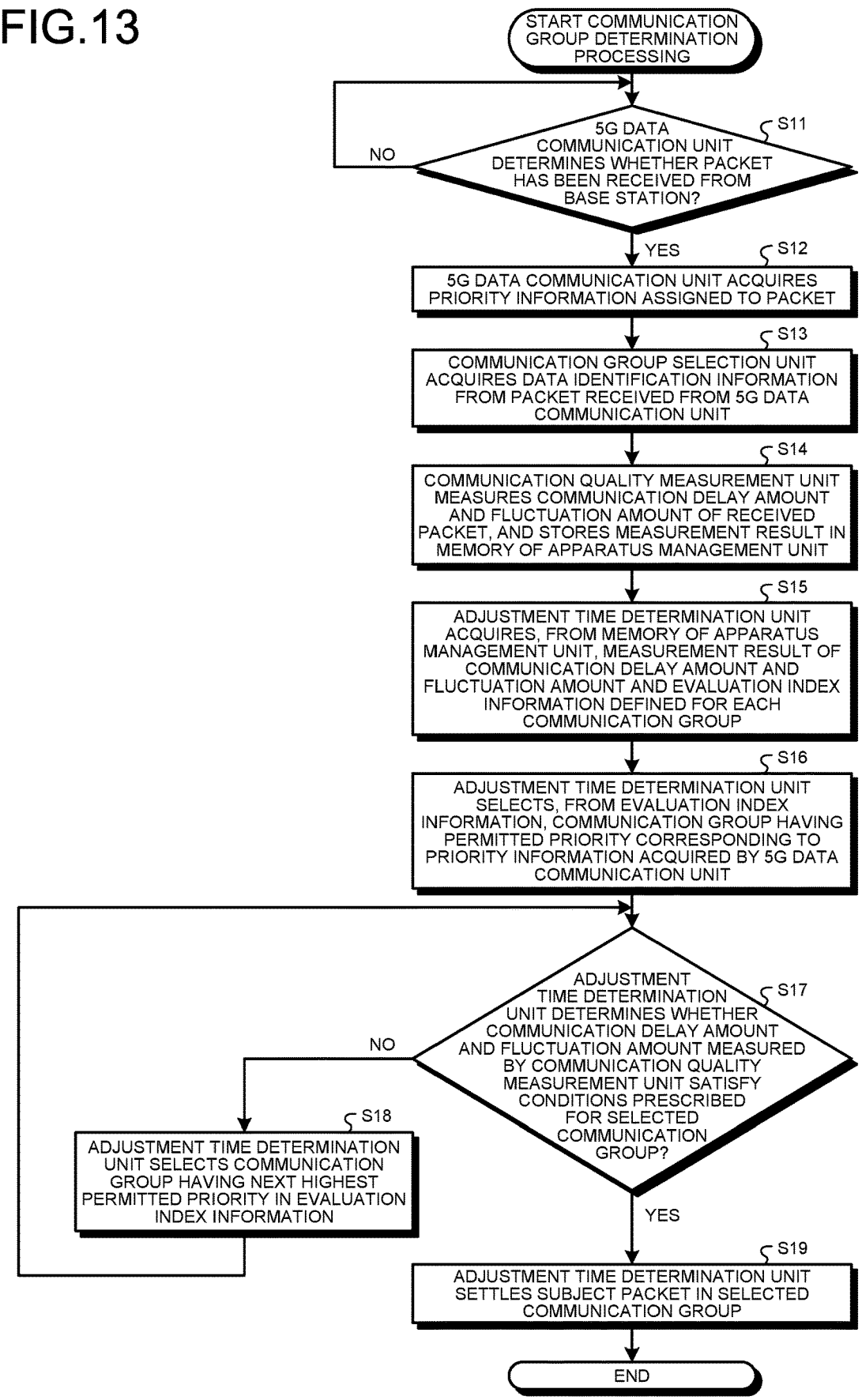
FIG. 13 is a flowchart illustrating an example of communication-group-determination-processing in the network-side interface conversion apparatus according to the first embodiment.

FIG. 13 is a flowchart illustrating an example of communication-group-determination-processing in the network-side interface conversion apparatus according to the first embodiment. FIG. 13 illustrates an exemplary procedure for a network configuration method with the network-side interface conversion apparatus 70. First, in the network-side interface conversion apparatus 70, the 5G data communication unit 121 determines whether a packet has been received from the base station 31 (step S11). In response to determining that a packet has not been received from the base station 31 (No in step S11), the 5G data communication unit 121 waits until a packet is received. In response to determining that a packet has been received from the base station 31 (Yes in step S11), the 5G data communication unit 121 acquires the priority information assigned to the packet (step S12).

Figure 14:
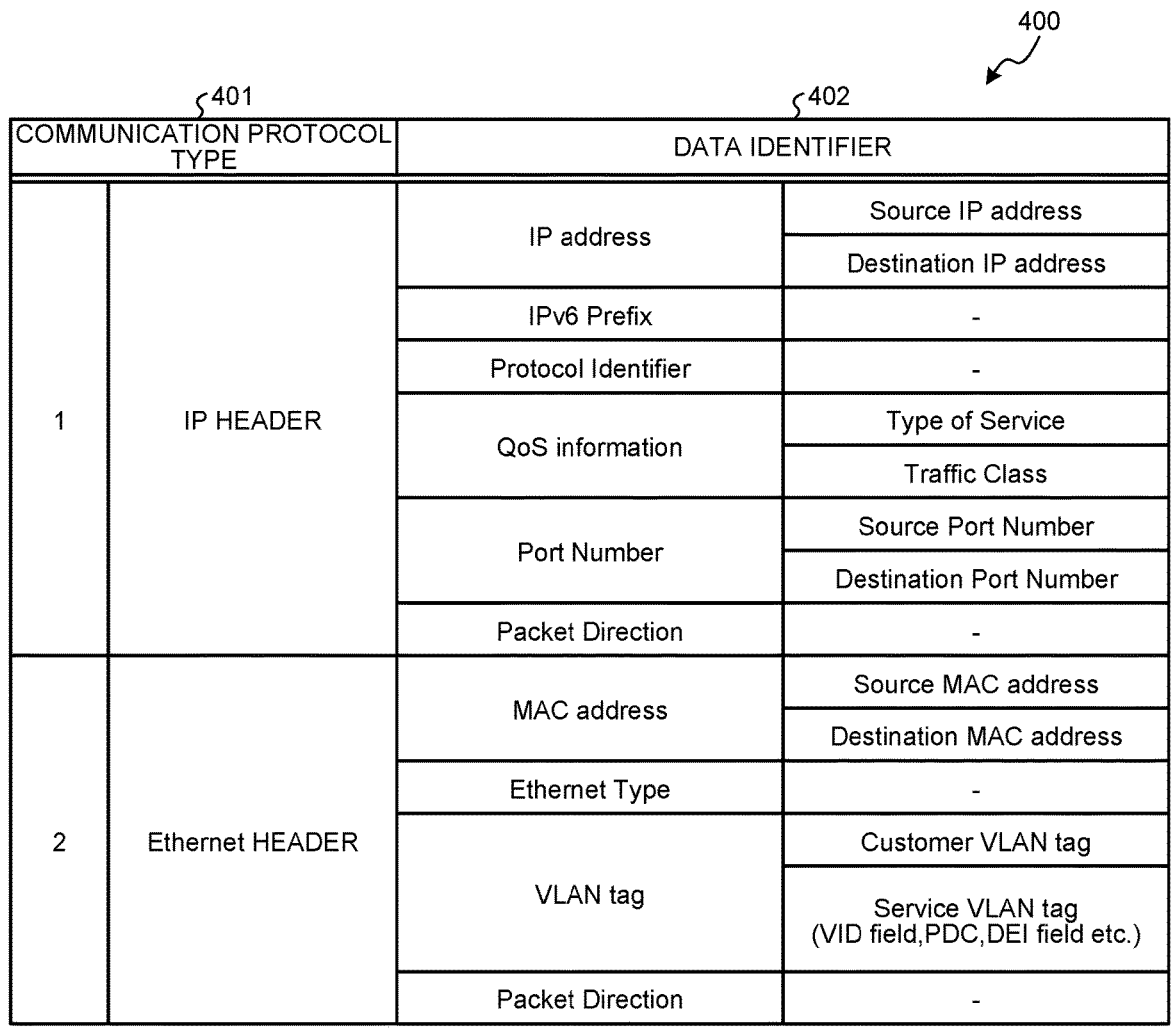
FIG. 14 is a diagram illustrating an example of parameters of data identification information according to the first embodiment.

Next, the communication group selection unit 125 acquires data identification information from the packet received from the 5G data communication unit 121 (step S13). FIG. 14 is a diagram illustrating an example of parameters of data identification information according to the first embodiment. As illustrated in FIG. 14, data identification information 400 is identification information including a communication protocol type 401 and individual parameters thereof represented by a data identifier 402. In the first embodiment, parameters of the Internet Protocol (IP) and the Ethernet protocol as the communication protocol type 401 are used as the data identification information 400; however, all the parameters may be used, or some of the parameters may be selectively used. In addition, identifier information of other communication protocols may be used, and the present disclosure is not limited to these examples.

Figure 15:
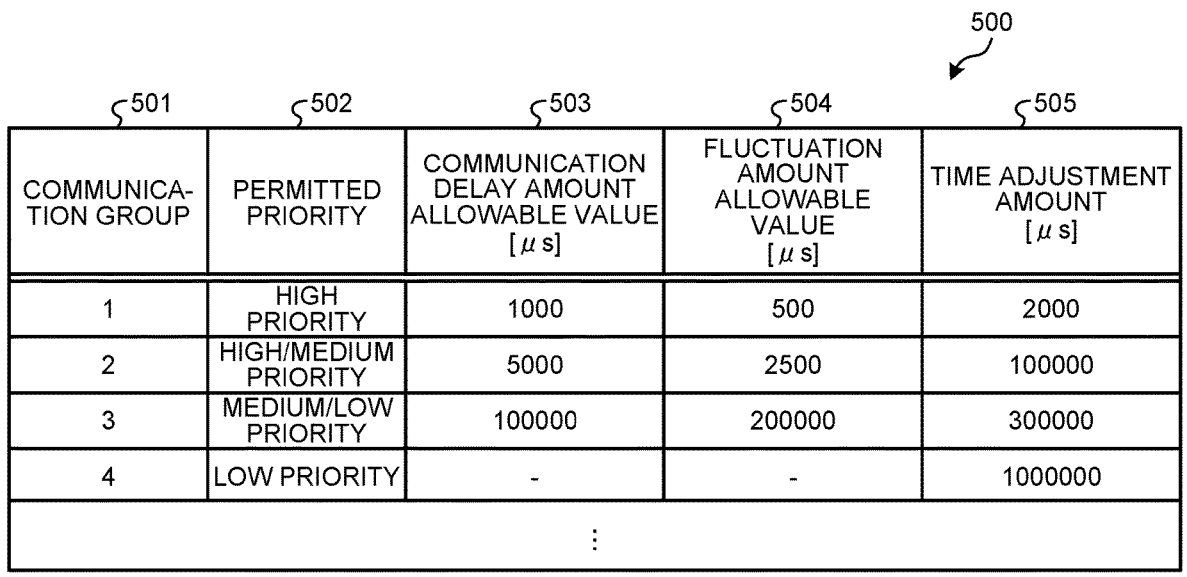
FIG. 15 is a diagram illustrating an example of evaluation index information stored in a memory provided in the network-side interface conversion apparatus according to the first embodiment.

Returning to FIG. 13, the communication quality measurement unit 123 measures the communication delay amount and the fluctuation amount of the received packet, and stores the measurement result in the memory 113 of the apparatus management unit 110 (step S14). Next, the adjustment time determination unit 124 acquires, from the memory 113 of the apparatus management unit 110, the measurement result of communication delay amount and fluctuation amount and the evaluation index information defined for each communication group (step S15). FIG. 15 is a diagram illustrating an exemplary configuration of evaluation index information stored in the memory provided in the network-side interface conversion apparatus according to the first embodiment. Evaluation index information 500 is information for use in classifying a communication group 501 from the communication delay amount and the fluctuation amount of the packet. The evaluation index information 500 includes conditions that a packet that can be classified into the communication group 501 fulfills, and a time adjustment amount 505 that is a time set for the communication group 501 to adjust a received packet. The conditions for each communication group 501 include a permitted priority 502 that is an allowable priority, a communication delay amount allowable value 503 that is an allowable communication delay amount, and a fluctuation amount allowable value 504 that is an allowable fluctuation amount. Here, the communication groups 501 are arranged in ascending order of the time adjustment amount 505.

Returning to FIG. 13, the adjustment time determination unit 124 selects, from the evaluation index information 500, the communication group 501 having the permitted priority 502 corresponding to the priority information acquired by the 5G data communication unit 121 (step S16). Next, the adjustment time determination unit 124 determines whether the communication delay amount and the fluctuation amount measured by the communication quality measurement unit 123 satisfy the conditions prescribed for the selected communication group 501 (step S17). Specifically, the adjustment time determination unit 124 determines whether the communication delay amount and the fluctuation amount of the received packet satisfy the target values of the communication group 501 having the permitted priority 502 corresponding to the priority information of the packet acquired in step S12, that is, the communication delay amount allowable value 503 and the fluctuation amount allowable value 504 of the selected communication group 501.

In response to determining that the communication delay amount and the fluctuation amount do not satisfy the conditions prescribed for the selected communication group 501 (No in step S17), the adjustment time determination unit 124 selects the communication group 501 having the next highest permitted priority 502 in the evaluation index information 500 (step S18). Thereafter, the processing returns to step S17.

On the other hand, in response to determining that the communication delay amount and the fluctuation amount satisfy the conditions prescribed for the selected communication group 501 (Yes in step S17), the adjustment time determination unit 124 settles the subject packet in the selected communication group 501 (step S19). That is, the adjustment time determination unit 124 associates the data identification information 400 with the communication group 501. This is the end of the communication-group-determination-processing.

Note that the communication group 501 corresponds to a time adjustment group having a buffer length corresponding to the time adjustment amount 505 of the evaluation index information 500 in the communication time adjustment unit 126. After the communication group 501 is determined, the communication group selection unit 125 selects the communication group 501 corresponding to the data identification information 400 upon receiving the packet, and transfers the packet to the corresponding time adjustment group of the communication time adjustment unit 126.

Figure 16:
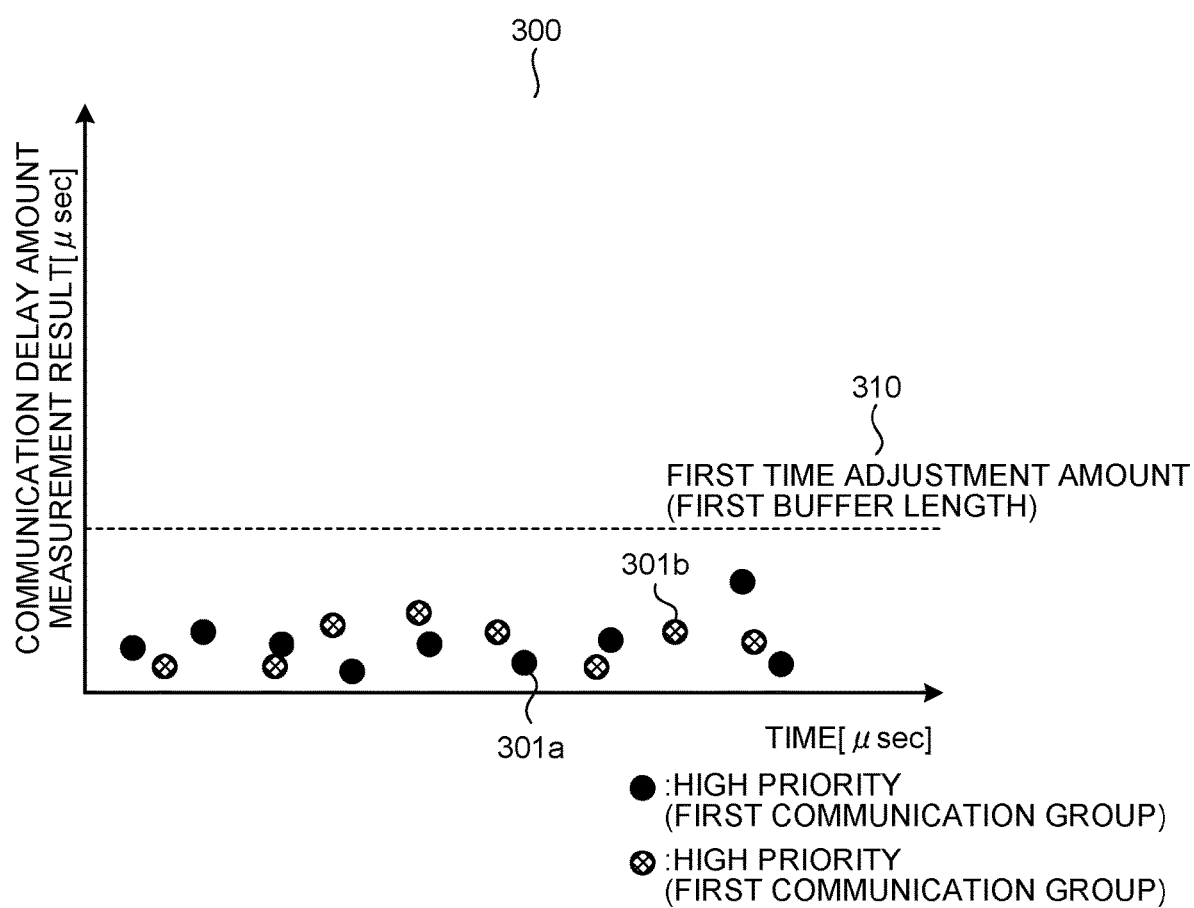
FIG. 16 is a diagram illustrating an example in which the measurement results illustrated in FIG. 10 are classified into communication groups based on the evaluation index information.
Figure 17:
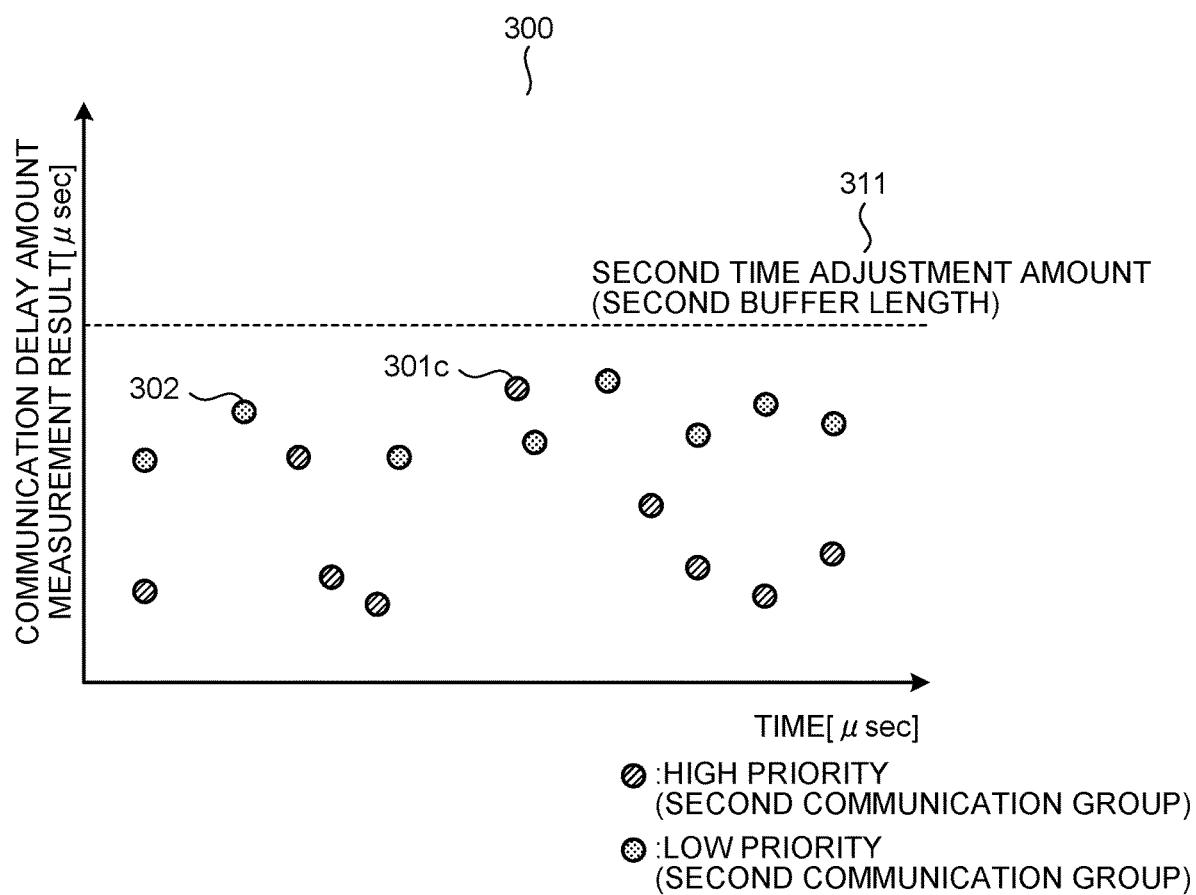
FIG. 17 is a diagram illustrating an example in which the measurement results illustrated in FIG. 10 are classified into communication groups based on the evaluation index information.

FIGS. 16 and 17 are diagrams illustrating an example in which the measurement results illustrated in FIG. 10 are classified into communication groups based on the evaluation index information. Note that components identical to those in FIG. 10 are denoted by the same reference signs, and the description thereof will be omitted. FIG. 16 illustrates an example in which the measurement results 301a and 301b with "high priority" among the measurement results illustrated in FIG. 10 are classified into a first communication group. Here, the time adjustment amount is a first time adjustment amount 310, and the buffer length is a first buffer length. FIG. 17 illustrates an example in which the measurement results 301c with "high priority" and the measurement results 302 with "low priority" among the measurement results illustrated in FIG. 10 are classified into a second communication group. Here, the time adjustment amount is a second time adjustment amount 311, and the buffer length is a second buffer length.

Figure 18:
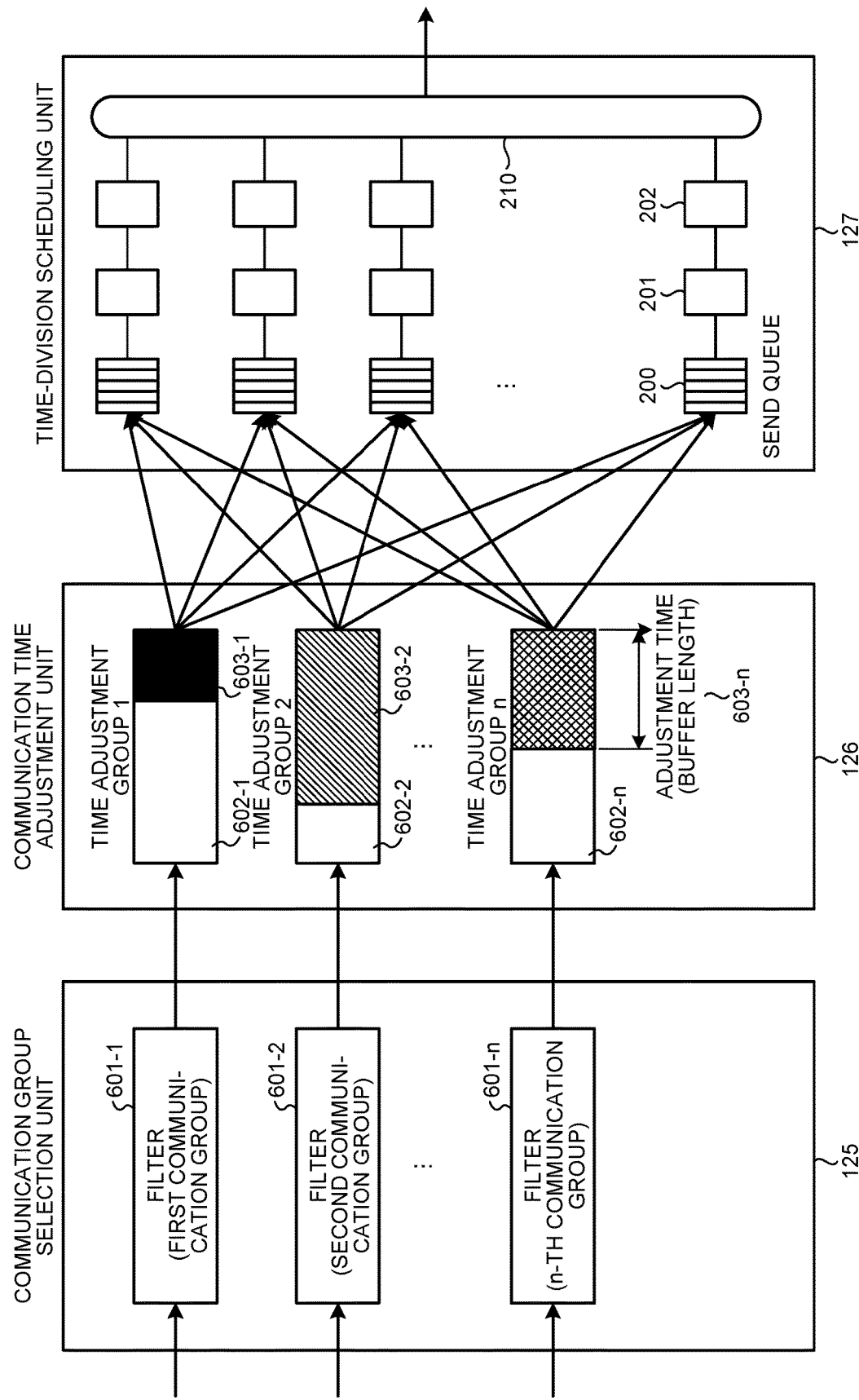
FIG. 18 is a diagram illustrating an exemplary configuration for connection of communication groups in the data processing unit according to the first embodiment.

A configuration for connection of the communication group selection unit 125, the communication time adjustment unit 126, and the time-division scheduling unit 127 in the network-side interface conversion apparatus 70 will be described. FIG. 18 is a diagram illustrating an exemplary configuration for connection of communication groups in the data processing unit according to the first embodiment.

The communication group selection unit 125 internally includes filters 601-1 to 601-n each corresponding to the evaluation index information 500 of one communication group 501. Here, n is a natural number of two or more. In the following description, each of the filters 601-1 to 601-n may be collectively referred to as the filter 601 when it is not necessary to distinguish therebetween. The filter 601 determines which packet's data identification information 400, among the packet's data identification information 400 registered in each communication group 501 in the communication-group-determination-processing, matches the data identification information 400 of the packet received from the 5G data communication unit 121. In response to determining that the packet received from the 5G data communication unit 121 belongs to its communication group 501, the filter 601 transfers the packet as data of its group to the communication time adjustment unit 126. In response to determining that the received packet does not belong to its communication group 501, the filter 601 does not transfer the packet to the communication time adjustment unit 126. In this manner, the communication group selection unit 125 transfers packets to corresponding time adjustment buffers 603-1 to 603-n of the communication time adjustment unit 126 through the filters 601 that are set based on the correspondence relationship between the communication group 501 and the data identification information 400 determined by the adjustment time determination unit 124.

The communication time adjustment unit 126 internally includes time adjustment groups 602-1 to 602-n and the corresponding time adjustment buffers 603-1 to 603-n, respectively. The time adjustment groups 602-1 to 602-n correspond one-to-one to the filters 601-1 to 601-n of the respective communication groups 501 in the communication group selection unit 125. The time adjustment buffers 603-1 to 603-*n* corresponding to the time adjustment groups 602-1 to 602-*n* each have a length corresponding to the time adjustment amount 505 stored in the evaluation index information 500. The communication time adjustment unit 126 performs fluctuation adjustment for each of the time adjustment groups 602-1 to 602-*n*, and then performs transfer to the send queue 200 of the time-division scheduling unit 127 according to the priority.

Note that the configuration of the time-division scheduling unit 127 has been described with reference to FIG. 7 and thus is omitted here.

Figure 19:
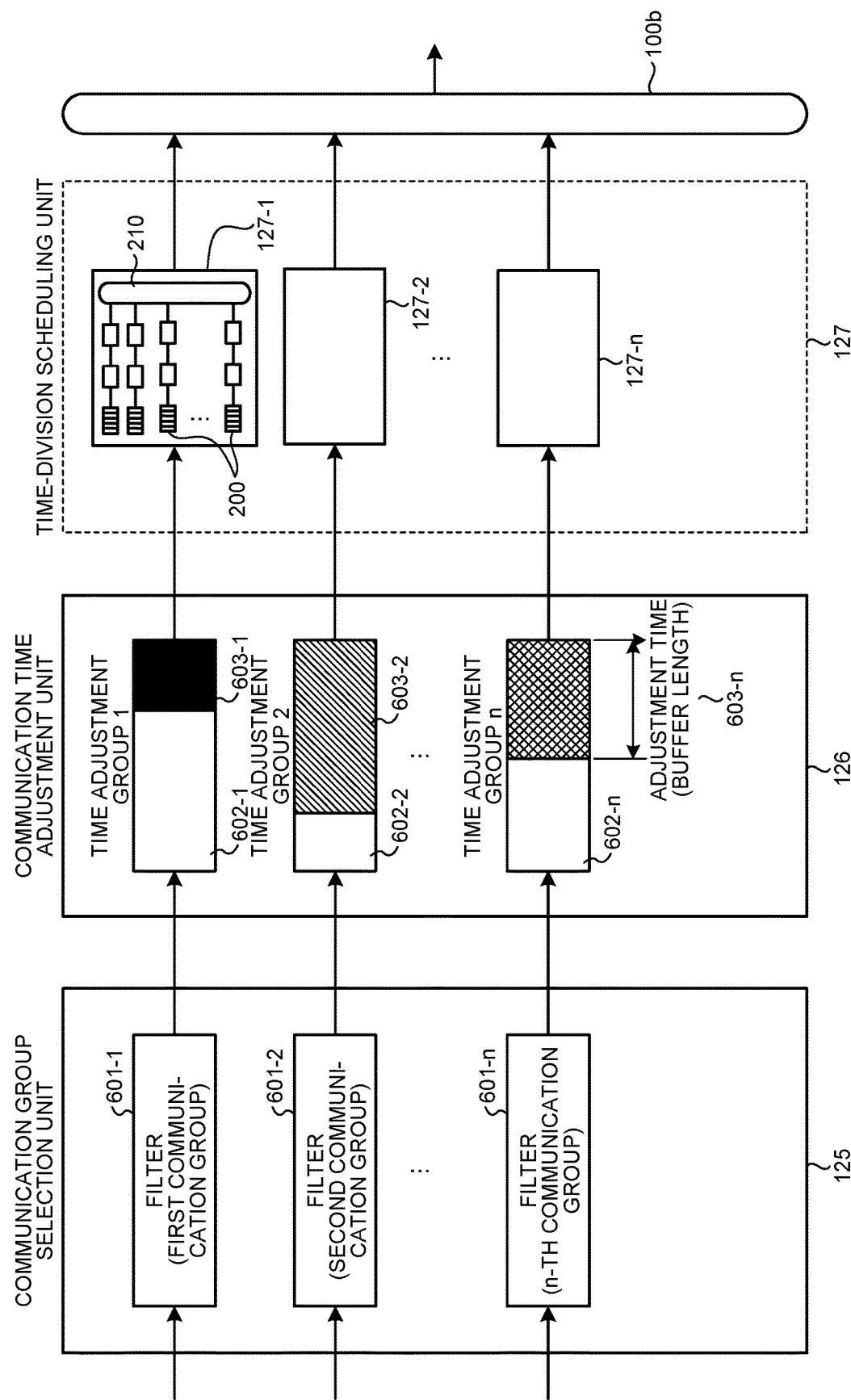
FIG. 19 is a diagram illustrating another exemplary configuration for connection of communication groups in the data processing unit according to the first embodiment.

FIG. 19 is a diagram illustrating another exemplary configuration for connection of communication groups in the data processing unit according to the first embodiment. FIG. 19 illustrates a connection configuration in which the time-division scheduling unit 127 is associated with individual communication groups 501. That is, in FIG. 19, the data processing unit 120 includes time-division scheduling units 127-1 to 127-*n* for the respective communication groups 501. Stated differently, in FIG. 19, the n time-division scheduling units 127-1 to 127-*n* constitute the time-division scheduling unit 127. The configuration of each of the time-division scheduling units 127-1 to 127-*n* is the same as that of the time-division scheduling unit 127 illustrated in FIG. 7. In FIG. 18, packets are sent from each of the time adjustment buffers 603-1 to 603-*n* of the communication time adjustment unit 126 to any of the send queues 200 of the time-division scheduling unit 127. In contrast, in FIG. 19, packets are sent from the time adjustment buffers 603-1 to 603-*n* of the communication time adjustment unit 126 to the send queues 200 of the time-division scheduling units 127-1 to 127-*n* provided corresponding to the time adjustment buffers 603-1 to 603-*n*, respectively.

In the first embodiment, every communication group 501 exists in the same network-side interface conversion apparatus 70. Alternatively, different communication groups 501 can exist in different network-side interface conversion apparatuses 70. Specifically, the communication group selection unit 125 can also assign the communication-grouped packet processing to another network-side interface conversion apparatus 70 provided in a geographically different location. In this case, a similar function may be implemented by changing the network-side interface conversion apparatus 70 connected to the base station 31 through communication group determination.

Figure 20:
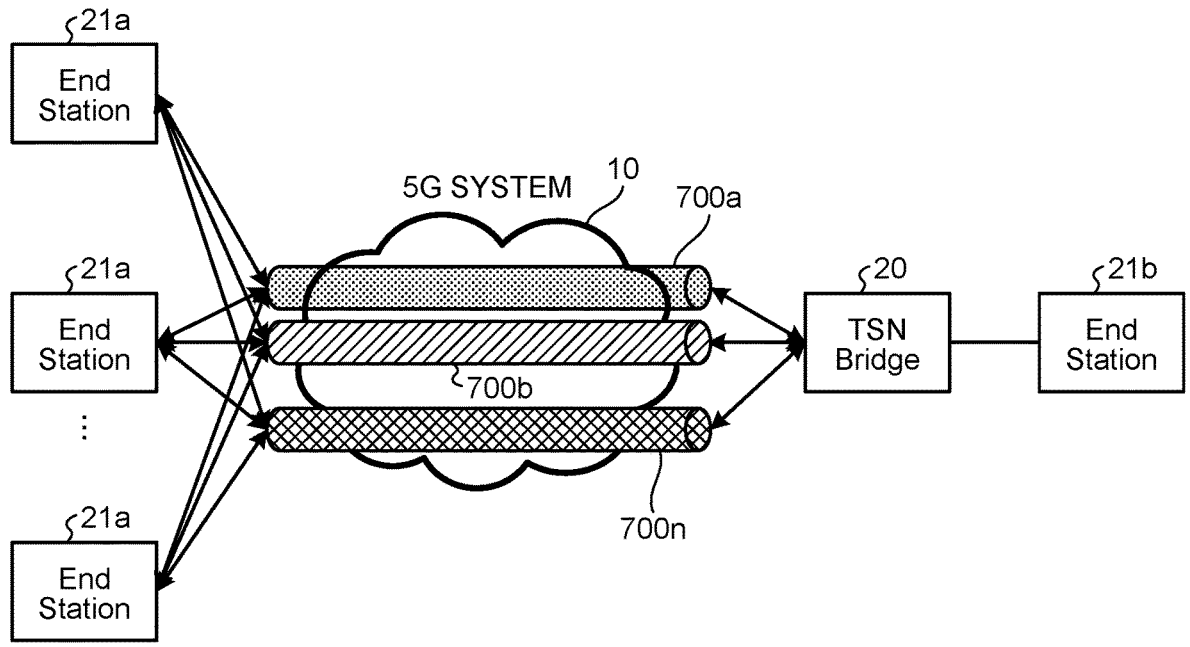
FIG. 20 is a diagram illustrating an example of a TSN link established on the 5G system by application of communication groups according to the first embodiment.

FIG. 20 is a diagram illustrating an example of a TSN link established on the 5G system by application of communication groups according to the first embodiment. The network between the network-side interface conversion apparatus 70 and the device-side interface conversion apparatus 50 in the 5G system 10 includes a plurality of time adjustment groups having different fluctuation adjustment times. As a result, the time-constrained applications of the TSN bridge 20 and the endstations 21*a* and 21*b* can assume that there are a plurality of TSN links 700*a*, 700*b*, and 700*n* having a fixed delay time in the logical TSN bridge of the 5G system 10.

As described above, in the 5G system 10, upon a change in the radio wave environment due to movement, shielding, relay, or the like, data having the same priority require the adjustment of fluctuations in data arrival time based on communication lines that are significantly affected by the radio wave environment, which affects the performance of communication lines that are not significantly affected by the radio wave environment and have good communication quality.

Note that the description in the first embodiment, which focuses on the network-side interface conversion apparatus 70 for the sake of simplicity, also applies to the device-side interface conversion apparatus 50. In the device-side interface conversion apparatus 50, processing for packets sent from the network-side interface conversion apparatus 70 often uses the same radio wave environment, and the technique of the present disclosure is expected to be beneficial to processing of packets transferred from the device-side interface conversion apparatus 50 connected to another mobile station 30 to the device-side interface conversion apparatus 50 via the network-side interface conversion apparatus 70.

As described above, according to the first embodiment, the network-side interface conversion apparatus 70 and the device-side interface conversion apparatus 50 measure and evaluate the communication delay amount and the fluctuation amount of data, and perform grouping into communication lines that are significantly affected by the radio wave environment and communication lines that are not significantly affected by the radio wave environment, thereby implementing control with different fluctuation adjustment times. Specifically, even data having the same priority can be classified into different communication groups 501, i.e. a communication group for data with a large communication delay amount and a communication group for data with a small communication delay amount, which are controlled using different fluctuation adjustment times. As a result, transmission performance can be improved in the mobile wireless communication network 1 including a large number of communication lines having different radio wave environments. In particular, in the mobile wireless communication network 1 that transmits data according to an industrial protocol with strict quality requirements, grouping the communication lines constituting the TSN links 700 with different radio wave environments enables a reduction in the influence of fluctuation adjustment time on data transmission caused by different radio wave environments.

Second Embodiment

The first embodiment is based on the premise that the communication delay between the device-side interface conversion apparatus 50 and the network-side interface conversion apparatus 70 can be measured on the mobile wireless communication network 1. However, there may be cases where the communication delay cannot be measured due to network function control or the like. In the second embodiment, a communication group selection method for use in such a situation will be described.

In the second embodiment, the configuration of each apparatus constituting the mobile wireless communication network 1 is similar to that in the first embodiment; however, the measurement method and the evaluation method in the communication quality measurement units 123 and 173 and the adjustment time determination units 124 and 174 of the network-side interface conversion apparatus 70 and the device-side interface conversion apparatus 50 are different from those in the first embodiment. Therefore, in the following description, parts identical to those in the first embodiment are denoted by the same reference signs as those in the first embodiment so that redundant descriptions can be omitted, and parts different from those in the first embodiment will be described.

Figure 21:
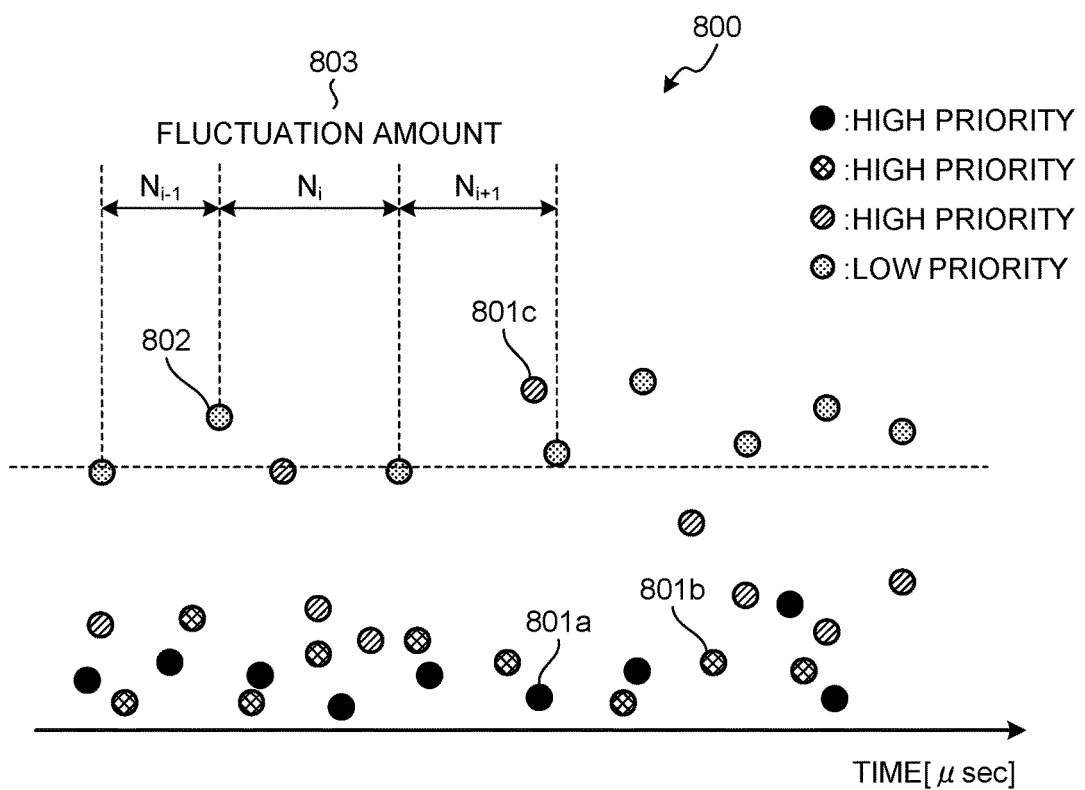
FIG. 21 is a diagram illustrating an example of a measurement result of fluctuation amount in a 5G system according to a second embodiment.

FIG. 21 is a diagram illustrating an example of a measurement result of fluctuation amount in the 5G system according to the second embodiment. A measurement result 800 of fluctuation amount has priority information identified with QoS information of the 5G system 10 assigned to each packet transmitted in the 5G system 10. Measurement results 801*a*, 801*b*, and 801*c* indicate "high priority" packets with high priority, and measurement results 802 indicate "low priority" packets with low priority. In one example, the horizontal axis in FIG. 21 is the time at which a packet is received. A fluctuation amount 803 is measured as a reception interval between packets. The fluctuation amount 803 in FIG. 21 is a reception interval between packets with low priority, and is denoted by $N_{i-1}$, $N_i$, and $N_{i+1}$. In one example, the communication quality measurement units 123 and 173 measure the fluctuation amount 803 inside the mobile communication system from the difference between the times of input of packets at the interface conversion apparatus serving as a receiving terminal. Note that in the second embodiment, the communication delay amount cannot be directly recognized; however, because priority control based on QoS information, that is, priority, is applied in the mobile wireless communication network 1, the average of communication delay amount is regarded as being equivalent on each communication line, and the influence of the radio wave environment is grasped only with the fluctuation amount.

Figure 22:
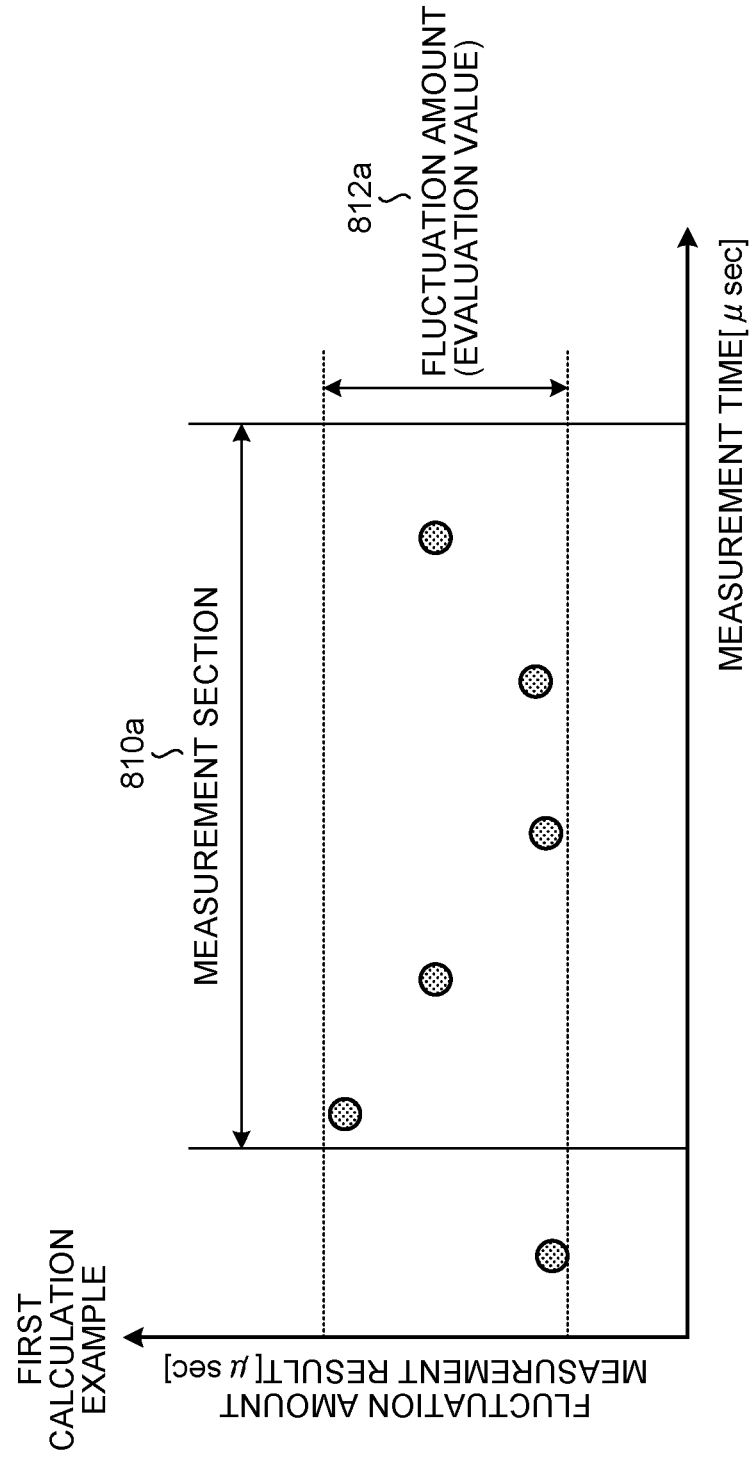
FIG. 22 is a diagram illustrating an exemplary method of calculating an evaluation value of fluctuation amount from the measurement result of fluctuation amount in the 5G system according to the second embodiment.

FIG. 22 is a diagram illustrating an exemplary method of calculating an evaluation value of fluctuation amount from the measurement result of fluctuation amount in the 5G system according to the second embodiment. In FIG. 22, the horizontal axis represents the measurement time, and the vertical axis represents the fluctuation amount measurement result. In the first calculation example illustrated in FIG. 22, the difference between the maximum value and the minimum value of fluctuation amount from the measurement results in a measurement section 810*a* is calculated as an evaluation value of fluctuation amount 812*a*.

Figure 23:
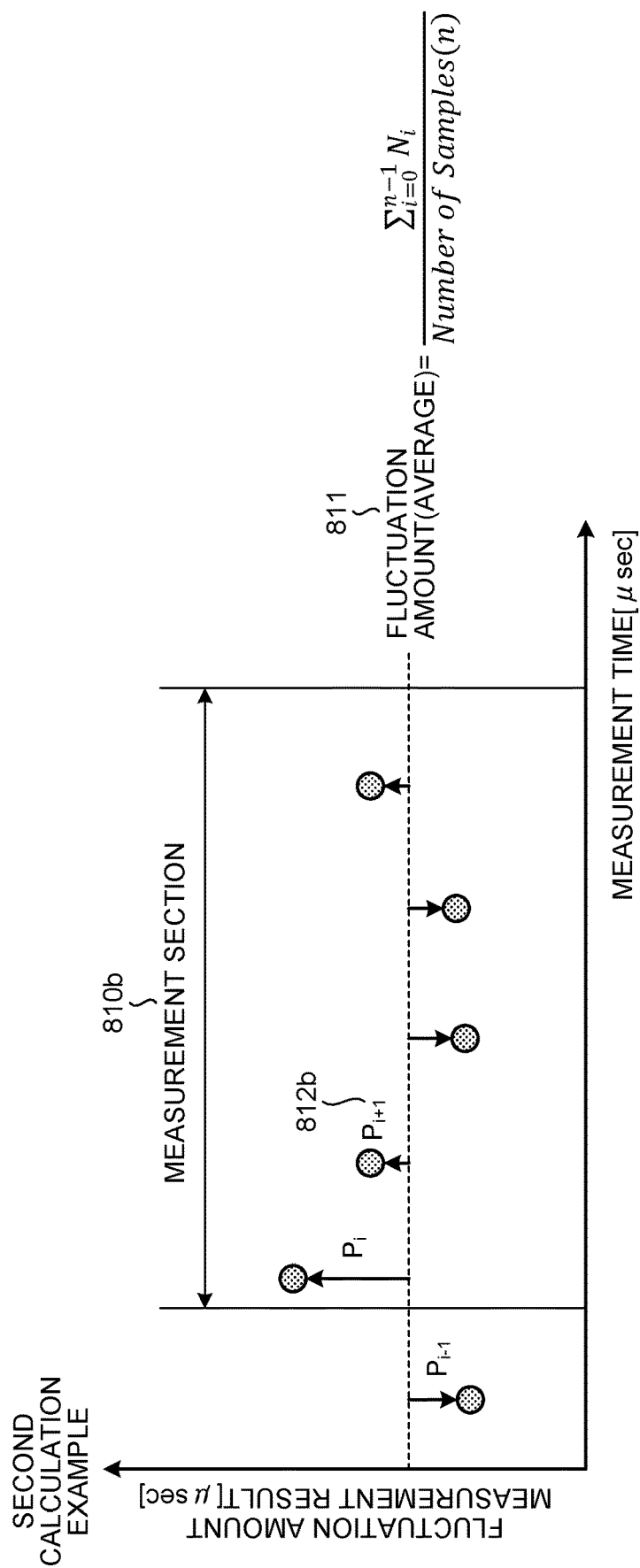
FIG. 23 is a diagram illustrating an exemplary method of calculating an evaluation value of fluctuation amount from the measurement result of fluctuation amount in the 5G system according to the second embodiment.

FIG. 23 is a diagram illustrating an exemplary method of calculating an evaluation value of fluctuation amount from the measurement result of fluctuation amount in the 5G system according to the second embodiment. In FIG. 23, the horizontal axis represents the measurement time, and the vertical axis represents the fluctuation amount measurement result. In the second calculation example illustrated in FIG. 23, a time error 812*b* from a reference value, i.e. an average 811 of measurement results of fluctuation amount in a measurement section 810*b*, is calculated as an evaluation value $P_i$, $P_{i+1}$, etc. of fluctuation amount. Note that other methods may be used for calculating an evaluation value of fluctuation amount. In one example, as the reference value for the calculation of the time error 812*b* in the second calculation example, the median of measurement results of fluctuation amount or the maximum value of the time error 812*b* may be used, instead of the average 811 of measurement results of fluctuation amount.

Figures 24, 25:
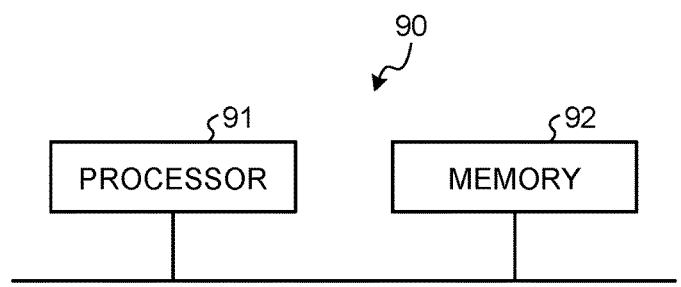
FIG. 24 is a diagram illustrating an example of evaluation index information for communication-group-determination-processing stored in a memory provided in the network-side interface conversion apparatus according to the second embodiment.
FIG. 25 is a diagram illustrating an exemplary configuration of processing circuitry in the case that the processing circuitry provided in the network-side interface conversion apparatus according to the first and second embodiments is implemented by a processor and a memory.

FIG. 24 is a diagram illustrating an example of evaluation index information for communication-group-determination-processing stored in the memory provided in the network-side interface conversion apparatus according to the second embodiment. Evaluation index information 900 in FIG. 24 does not include an item corresponding to the communication delay amount allowable value 503, as compared with the evaluation index information 500 in FIG. 15 according to the first embodiment. Specifically, the evaluation index information 900 is information prescribing, for each communication group 901, conditions of a permitted priority 902 that is an allowable priority and a fluctuation amount allowable value 903 that is an allowable fluctuation amount, and prescribing a time adjustment amount 904 that is a time for adjusting a received packet for each communication group 901. Here, the communication groups 901 are arranged in ascending order of the time adjustment amount 904.

In the communication-group-determination-processing of the network-side interface conversion apparatus 70 according to the second embodiment, processing similar to that in FIG. 13 is performed. However, in step S15, the adjustment time determination unit 124 acquires the evaluation index information 900 illustrated in FIG. 24 from the memory 113 of the apparatus management unit 110. In addition, in step S17, the adjustment time determination unit 124 determines whether the fluctuation amount measured by the communication quality measurement unit 123 satisfies the fluctuation amount allowable value 903 prescribed for the selected communication group 901. Consequently, the communication group 901 can be selected in step S19.

Note that the description in the second embodiment, which again focuses on the network-side interface conversion apparatus 70, also applies to the device-side interface conversion apparatus 50.

As described above, according to the second embodiment, the network-side interface conversion apparatus 70 and the device-side interface conversion apparatus 50 measure and evaluate the fluctuation amount of data, and perform grouping into communication lines that are significantly affected by the radio wave environment and communication lines that are not significantly affected by the radio wave environment, thereby implementing control with different fluctuation adjustment times. As a result, transmission performance concerning an industrial protocol with strict quality requirements can be improved in the mobile wireless communication network 1 including a large number of communication lines having different radio wave environments.

Next, a hardware configuration of the network-side interface conversion apparatus 70 according to the first and second embodiments will be described. In the network-side interface conversion apparatus 70, the external interfaces 100*a* and 100*b* are external interfaces. The apparatus management unit 110, the data processing unit 120, and the communication unit 130 are implemented by processing circuitry. The processing circuitry may be a memory storing a program and a processor that executes the program stored in the memory, or may be dedicated hardware. The processing circuitry is also called a control circuit.

FIG. 25 is a diagram illustrating an exemplary configuration of processing circuitry in the case that the processing circuitry provided in the network-side interface conversion apparatus according to the first and second embodiments is implemented by a processor and a memory. The processing circuitry 90 illustrated in FIG. 25 is a control circuit and includes a processor 91 and a memory 92. In a case where the processing circuitry 90 is configured with the processor 91 and the memory 92, each function of the processing circuitry 90 is implemented by software, firmware, or a combination of software and firmware. Software or firmware is described as a program and stored in the memory 92. In the processing circuitry 90, the processor 91 reads and executes the program stored in the memory 92, thereby implementing each function. That is, the processing circuitry 90 includes the memory 92 for storing the program that results in the processing of the network-side interface conversion apparatus 70. It can also be said that this program is a program for causing the network-side interface conversion apparatus 70 to execute each function implemented by the processing circuitry 90. This program may be provided by a storage medium in which the program is stored, or may be provided by other means such as a communication medium.

The processor 91 is exemplified by a central processing unit (CPU), a processing device, an arithmetic device, a microprocessor, a microcomputer, or a digital signal processor (DSP). Examples of the memory 92 include a non-volatile or volatile semiconductor memory, a magnetic disk, a flexible disk, an optical disc, a compact disc, a mini disc, a digital versatile disc (DVD), and the like. Examples of non-volatile or volatile semiconductor memories include a random access memory (RAM), a read only memory (ROM), a flash memory, an erasable programmable ROM (EPROM), an electrically EPROM (EEPROM, registered trademark), and the like.

Figure 26:
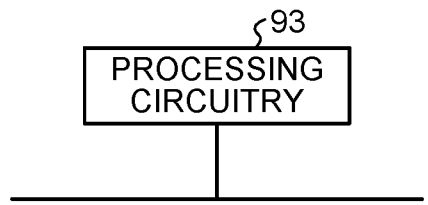
FIG. 26 is a diagram illustrating an exemplary configuration of processing circuitry in the case that the processing circuitry provided in the network-side interface conversion apparatus according to the first and second embodiments is configured by hardware.

FIG. 26 is a diagram illustrating an exemplary configuration of processing circuitry in the case that the processing circuitry provided in the network-side interface conversion apparatus according to the first and second embodiments is configured by hardware. For example, the processing circuitry 93 illustrated in FIG. 26 is a single circuit, a composite circuit, a programmed processor, a parallel programmed processor, an application specific integrated circuit (ASIC), a field-programmable gate array (FPGA), or a combination thereof. The processing circuitry 93 may be partially implemented by dedicated hardware, and partially implemented by software or firmware. In this manner, the processing circuitry 93 can implement the above-described functions using dedicated hardware, software, firmware, or a combination thereof.

The hardware configuration of the network-side interface conversion apparatus 70 described above also applies to the hardware configuration of the device-side interface conversion apparatus 50.

The interface conversion apparatus according to the present disclosure can achieve the effect of reducing the influence of fluctuation adjustment time on data transmission caused by different radio wave environments in a mobile wireless communication network that transmits data according to an industrial protocol.

The configurations described in the above-mentioned embodiments indicate examples. The embodiments can be combined with another well-known technique and with each other, and some of the configurations can be omitted or changed in a range not departing from the gist.

What is claimed is:

1. An interface conversion apparatus to be provided in a mobile communication system that transmits data according to an industrial protocol, the interface conversion apparatus comprising:
 processing circuitry
 to measure communication quality inside the mobile communication system;
 to store history information including a measurement result of the communication quality measured;
 to: refer to evaluation index information specifying, for each communication group, an allowable range of variation in the measurement result of the communication quality allowed and a fluctuation adjustment time for absorbing a fluctuation in an arrival time of a packet received; and determine the communication group in which a variation in the measurement result of the communication quality obtained from the history information falls within the allowable range for each piece of identification information including a communication protocol type included in the packet;
 to select the communication group of the packet received from the identification information of the packet received, based on a correspondence relationship between the communication group determined and the identification information of the packet; and
 to control the packet received for each communication group, using the fluctuation adjustment time in the evaluation index information corresponding to the communication group that is determined.

2. The interface conversion apparatus according to claim 1, wherein
 as the communication quality, the processing circuitry measures a delay amount inside the mobile communication system measured from a difference between a time of output from an interface conversion apparatus serving as a sending terminal in the mobile communication system and a time of input from an interface conversion apparatus serving as a receiving terminal, and a fluctuation amount of the packet calculated from the delay amount,
 as the allowable range of the communication quality, the evaluation index information includes an allowable value of the delay amount and an allowable value of the fluctuation amount, and
 the processing circuitry refers to the evaluation index information to determine, for each piece of the identification information, the communication group in which measurement results of the delay amount and the fluctuation amount obtained from the history information satisfy the allowable value of the delay amount and the allowable value of the fluctuation amount.

3. The interface conversion apparatus according to claim 2, wherein the allowable range of the communication quality is different depending on the communication group.

4. The interface conversion apparatus according to claim 3, wherein the processing circuitry assigns communication-grouped packet processing to another interface conversion apparatus provided in a geographically different location.

5. The interface conversion apparatus according to claim 2, wherein the processing circuitry assigns communication-grouped packet processing to another interface conversion apparatus provided in a geographically different location.

6. The interface conversion apparatus according to claim 1, wherein
 the processing circuitry measures a fluctuation amount inside the mobile communication system from a difference between times of input at an interface conversion apparatus serving as a receiving terminal in the mobile communication system,
 as the allowable range of the communication quality, the evaluation index information includes an allowable value of the fluctuation, and
 the processing circuitry refers to the evaluation index information to determine, for each piece of the identification information, the communication group in which a measurement value of the fluctuation amount obtained from the history information satisfies the allowable value of the fluctuation amount.

7. The interface conversion apparatus according to claim 6, wherein the allowable range of the communication quality is different depending on the communication group.

8. The interface conversion apparatus according to claim 7, wherein the processing circuitry assigns communication-grouped packet processing to another interface conversion apparatus provided in a geographically different location.

9. The interface conversion apparatus according to claim 6, wherein the processing circuitry assigns communication-grouped packet processing to another interface conversion apparatus provided in a geographically different location.

10. The interface conversion apparatus according to claim 1, wherein the allowable range of the communication quality is different depending on the communication group.

11. The interface conversion apparatus according to claim 10, wherein the processing circuitry assigns communication-grouped packet processing to another interface conversion apparatus provided in a geographically different location.

12. The interface conversion apparatus according to claim 1, wherein the processing circuitry assigns communication-grouped packet processing to another interface conversion apparatus provided in a geographically different location.

13. A control circuit for controlling an interface conversion apparatus to be provided in a mobile communication system that transmits data according to an industrial protocol, the control circuit causing the interface conversion apparatus to execute:
  measuring communication quality inside the mobile communication system;
  storing history information including a measurement result of the communication quality measured;
  referring to evaluation index information specifying, for each communication group, an allowable range of variation in the measurement result of the communication quality allowed and a fluctuation adjustment time for absorbing a fluctuation in an arrival time of a packet received, and determining the communication group in which a variation in the measurement result of the communication quality obtained from the history information falls within the allowable range for each piece of identification information including a communication protocol type included in the packet;
  selecting the communication group of the packet received from the identification information of the packet received, based on a correspondence relationship between the communication group determined and the identification information of the packet; and
  controlling the packet received for each communication group, using the fluctuation adjustment time in the evaluation index information corresponding to the communication group determined.

14. A non-transitory storage medium storing a program for controlling an interface conversion apparatus to be provided in a mobile communication system that transmits data according to an industrial protocol, the program causing the interface conversion apparatus to execute:
  measuring communication quality inside the mobile communication system;
  storing history information including a measurement result of the communication quality measured;
  referring to evaluation index information specifying, for each communication group, an allowable range of variation in the measurement result of the communication quality allowed and a fluctuation adjustment time for absorbing a fluctuation in an arrival time of a packet received, and determining the communication group in which a variation in the measurement result of the communication quality obtained from the history information falls within the allowable range for each piece of identification information including a communication protocol type included in the packet;
  selecting the communication group of the packet received from the identification information of the packet received, based on a correspondence relationship between the communication group determined and the identification information of the packet; and
  controlling the packet received for each communication group, using the fluctuation adjustment time in the evaluation index information corresponding to the communication group determined.

15. A network configuration method for an interface conversion apparatus to be provided in a mobile communication system that transmits data according to an industrial protocol, the network configuration method comprising:
  measuring communication quality inside the mobile communication system;
  storing history information including a measurement result of the communication quality measured;
  referring to evaluation index information specifying, for each communication group, an allowable range of variation in the measurement result of the communication quality allowed and a fluctuation adjustment time for absorbing a fluctuation in an arrival time of a packet received; and determining the communication group in which a variation in the measurement result of the communication quality obtained from the history information falls within the allowable range for each piece of identification information including a communication protocol type included in the packet;
  selecting the communication group of the packet received from the identification information of the packet received, based on a correspondence relationship between the communication group determined and the identification information of the packet; and
  controlling the packet received for each communication group, using the fluctuation adjustment time in the evaluation index information corresponding to the communication group that is determined.

* * * * *